(12) United States Patent
Mar et al.

(10) Patent No.: US 7,023,852 B1
(45) Date of Patent: Apr. 4, 2006

(54) POLICY VERIFICATION METHODS AND APPARATUS

(75) Inventors: Aaron S. Mar, Vancouver (CA); Ronald Leonard Westfall, North Vancouver (CA)

(73) Assignee: Redback Networks, Inc., San Jose, CA (US)

( * ) Notice: Subject to any disclaimer, the term of this patent is extended or adjusted under 35 U.S.C. 154(b) by 778 days.

(21) Appl. No.: 09/991,031

(22) Filed: Nov. 21, 2001

Related U.S. Application Data

(60) Provisional application No. 60/252,576, filed on Nov. 24, 2000.

(51) Int. Cl.
*H04L 12/28* (2006.01)
*H04L 12/56* (2006.01)
*H04J 3/14* (2006.01)

(52) U.S. Cl. .................. 370/392; 370/252; 370/398

(58) Field of Classification Search .......... 370/252, 370/389, 392, 395.1, 398, 395.21, 395.42, 370/395.43, 241
See application file for complete search history.

(56) References Cited

U.S. PATENT DOCUMENTS

| 4,736,363 | A | 4/1988 | Aubin et al. |
| 5,159,595 | A | 10/1992 | Flanagan et al. |
| 6,567,408 | B1 * | 5/2003 | Li et al. ............... 370/395.31 |

* cited by examiner

*Primary Examiner*—Chi Pham
*Assistant Examiner*—Ronald Abelson
(74) *Attorney, Agent, or Firm*—Blakely, Sokoloff Taylor & Zafman

(57) ABSTRACT

A number of classes are received. Each class has a number of classification rules. A result is output indicating a first class of the number of classes conflicts with a second class of the number of classes upon determining that at least one of classification rules of the first class overlaps with one of the classification rules of the second class.

32 Claims, 20 Drawing Sheets

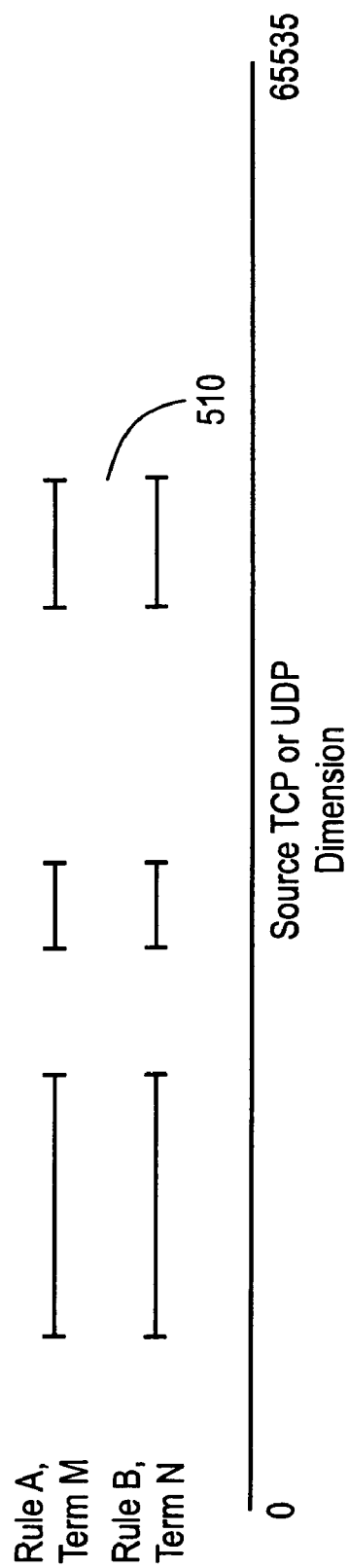

POLICY VERIFICATION METHODS AND APPARATUS

RELATED APPLICATIONS

The present application claims priority to the provisional filed application entitled Policy Verification Methods and Apparatus, filed on Nov. 24, 2000, Ser. No. 60/252,576.

FIELD OF THE INVENTION

This invention relates to the verification of policies that control how enhanced Quality of Service ("QoS") is enforced by a router or other packet forwarding device. More specifically this invention relates to methods and apparatus for verifying that a set of one or more policies does not specify more than one QoS treatment for any particular subset of the packets transiting through a router.

BACKGROUND OF THE INVENTION

Packet data networks are becoming increasingly important in today's economy. A good example of this is the Internet. The amount of traffic flowing over packet data networks, and especially IP networks, is increasing exponentially. The commercial value of the data communicated and the time spent communicating is increasing rapidly as well.

With the increased importance of packet networks has come increased scrutiny of the less desirable characteristics of such networks. The Internet provides global connectivity, but it is still unable to guarantee the throughput that will be experienced by a data connection. Response times vary widely. Real-time interactive communication requiring low delays is only marginally practical. There are an increasing number of applications whose success has been hampered or prevented by these problems.

To make it possible to successfully exploit the Internet and other packet data networks, it is necessary to control the QoS experienced by packets as they are being communicated across the packet data network. To deliver value-added services such as voice telephony, video conferencing, near real-time transaction processing and the like, the packet data network should control the bandwidth, delay, jitter, and reliability experienced by packets passing through the network. Since most packet data networks cannot provide the highest levels of QoS to all packets that they handle, a packet data network should provide individualized QoS treatment to a plurality of subsets of the packets transiting the network. Each subset is identified by classification rules that are used to categorize packets into classes according to the properties of the packets.

A specification of the QoS treatment to be provided in a packet data network can be considered to be a QoS policy. A QoS policy identifies a plurality of classes of packet traffic. Each class is defined by classification rules that specify the subset of packets that belong to the class. Each class can be associated with a level of QoS specifying, for example, the bandwidth, delay, jitter, and reliability treatment to be provided to packets belonging to the class. The policy may specify limits on the amount of traffic that will be admitted to the class.

The overall QoS policy for a packet data network may be embodied in a centralized policy server. Routers and other packet forwarding devices interact with the policy server to determine the QoS treatment that is to be provided to a subset of packets. FIG. 1 is a schematic diagram of a computer network with a central policy server. It shows computer 1 and computer 2 communicating via a data connection 30. Packets travel from computer 1 to computer 2 on a path which transits through routers 10, 12, 13, and 16. When one of these routers (typically the edge routers 10 and 16) needs to consult a QoS policy in order to determine the appropriate level of QoS to provide to the data connection, Common Open Policy Service ("COPS") queries 40 and 41 are sent to policy server 20. Policy server 20 returns a COPS result after consulting its policy database 21 to retrieve information specifying the relevant policy. Where better scalability is desired, the overall QoS policy may be broken up into multiple QoS policies that are installed in local policy servers or even in each router.

FIG. 2 is a schematic diagram of a computer network with distributed policy servers. It shows computer 101 and computer 102 communicating via data connection 130. Packets from computer 101 transit through routers 110, 112, 113, and 116 in traveling to computer 102. Each router has a QoS policy stored in its own policy database. When any of these routers needs to consult a QoS policy in order to determine the appropriate level of QoS to provide to the data connection, it need only consult its local policy database.

Regardless of whether QoS policy is centralized or distributed, a variety of errors can occur in a QoS policy. Classification rules for a plurality of classes may overlap resulting in ambiguous treatment being specified for some subset of packets. If numerous classes are assigned a large bandwidth, the total bandwidth may exceed the available data link capacity in the data network. If many of the classes specify low delays, it may be impossible to satisfy these delay requirements if the packet traffic in these classes are competing for access to certain data links in the packet data network.

Before a QoS policy can be used, it should be verified in order to ensure that there are no errors in the policy. If a policy containing errors is used, packets may be lost, or the intended QoS treatment may not be provided to the packets.

SUMMARY OF THE INVENTION

A number of classes are received. Each class has a number of classification rules. A result is output indicating a first class of the number of classes conflicts with a second class of the number of classes upon determining that at least one of classification rules of the first class overlaps with one of the classification rules of the second class.

BRIEF DESCRIPTION OF THE DRAWINGS

In figures which illustrate non-limiting embodiments of the invention:

FIG. 8 is a schematic diagram illustrating duplication between match terms according to one embodiment;

DETAILED DESCRIPTION

The verification methods and apparatus described herein identify errors of types that could result in packets simultaneously satisfying the classification rules of more than one class. Additionally, the policy verification methods and apparatus described herein are generally useful in situations where a policy is specifying some form of treatment (i.e. not necessarily QoS treatment) to be provided to a subset of packets by a router. The policy verification methods and apparatus have particular application in Internet Protocol ("IP") networks.

In one embodiment, each class in a QoS policy has a plurality of classification rules which define the packets to which the policy applies. If a received packet satisfies one of those rules, the packet is considered to belong to the class. If a received packet does not satisfy any of the rules then the received packet is not considered to belong to the class. Each classification rule consists of one or more terms. If a received packet satisfies all of the terms in a classification rule then it is considered to satisfy the classification rule.

In a preferred embodiment, each term in a classification rule identifies a data item and specifies a set of zero or more constant values and/or ranges of constant values. The data item may be a field in the packet or it might be a value from the environment in which the packet is processed. When a packet is received, the value of the specified field is extracted from the packet or the specified environment value is retrieved. The acquired value is compared to the set of constant values and/or constant value ranges in the classification rule term. If the acquired value matches any of the constant values or falls within any of the ranges, the classification rule term is considered to be satisfied.

Modern data communication protocols are structured on the seven-layer OSI model of protocols. In the Internet, layer 2 might be Ethernet, Frame Relay, ATM, or PPP. Layer 3 is IP. Layer 4 is typically TCP or UDP. Layers 5 to 7 can be any of a plethora of application level protocols (e.g. HTTP, FTP, SMTP). Protocols used in other packet data networks (e.g. SNA) use similar layering.

Figure 1:
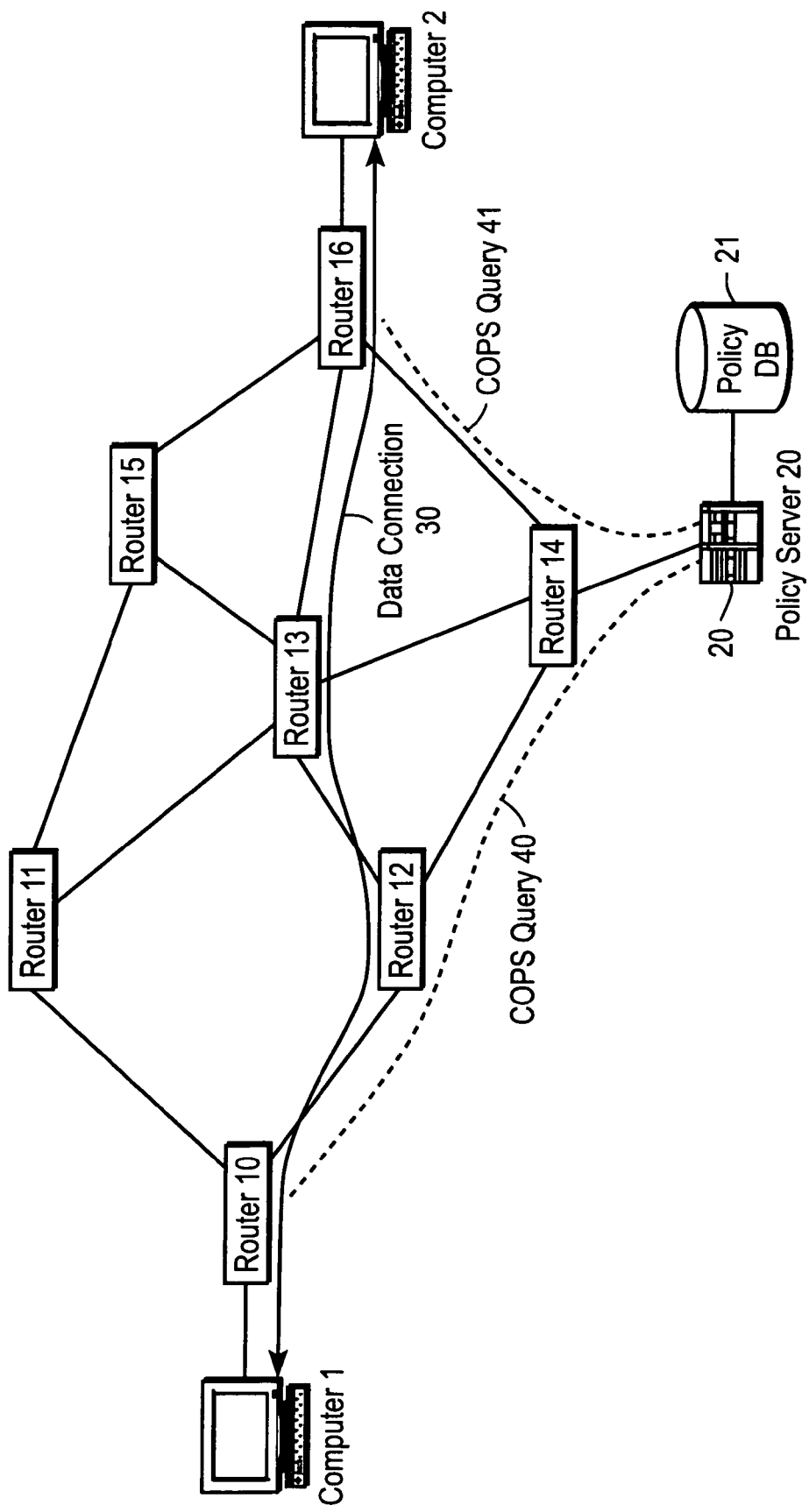
FIG. 1 is a schematic diagram of a computer network with a central policy server.
Figure 2:
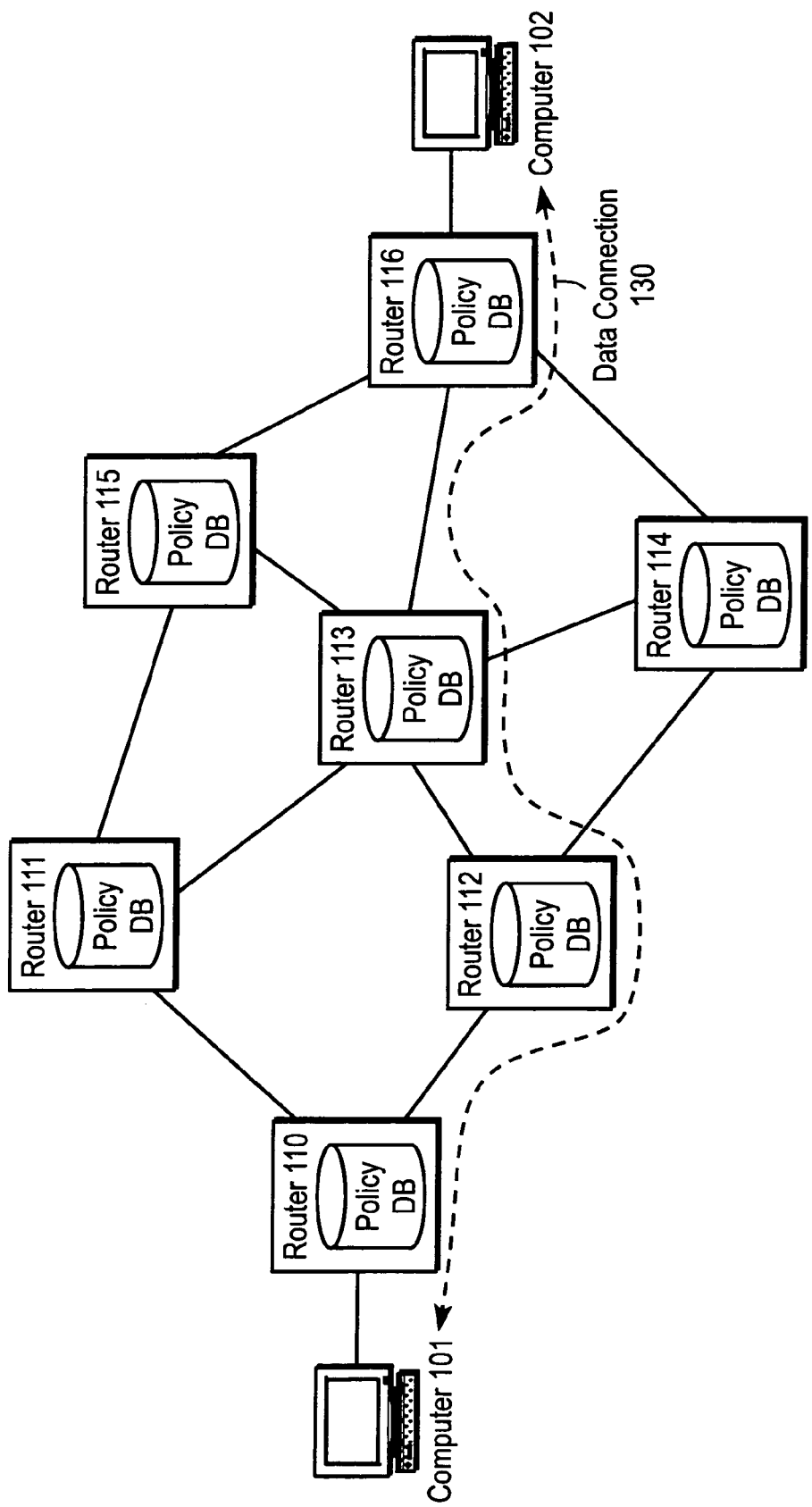
FIG. 2 is a schematic diagram of a computer network with distributed policy servers.
Figure 3:
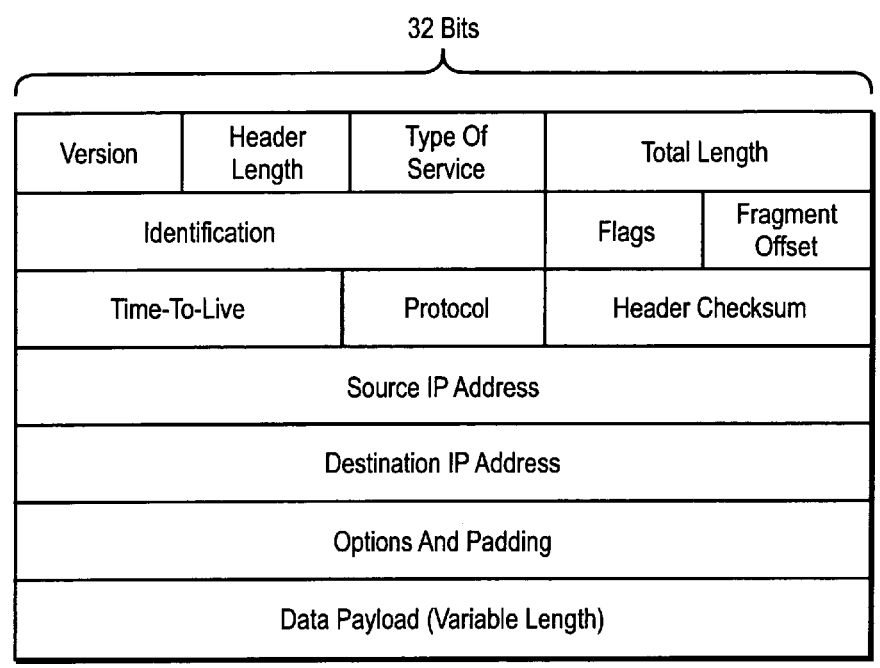
FIG. 3 is a schematic diagram illustrating fields in the header of an IP packet according to one embodiment.

A packet field that is specified in a classification rule term might in one embodiment be located in any of the protocol layers. For example, it might be a source MAC address from an Ethernet frame header, a Virtual Circuit Identifier (VCI) from an ATM cell header, a destination IP address from an IP header, an Ack flag bit from a TCP header, or a URL Location from an HTTP response. FIG. 3 is a schematic diagram illustrating fields in the header of an IP packet according to one embodiment. It shows the fields in the header of an IP v.4 data packet. In one embodiment, any of these fields could conceivably be used for packet classification.

An environmental value may be any data item that is relevant to the received packet. Environmental values which could be used for packet classification include, in one embodiment, values such as the date and time when the packet is received; the identity of the router interface on which the packet was received; and the like.

A classification rule term may in one embodiment contain zero or more individual constant values. The rule term may contain zero or more constant value ranges that are expressed by specifying the minimum and maximum values included in each range. For packet fields containing IP addresses, the rule term may contain zero or more IP subnets, which are ranges whose minimum and maximum values are constrained. In this specification, constant values, ranges of constant values, and IP subnets specified in a classification rule term shall collectively be referred to as match values.

Figure 4A:
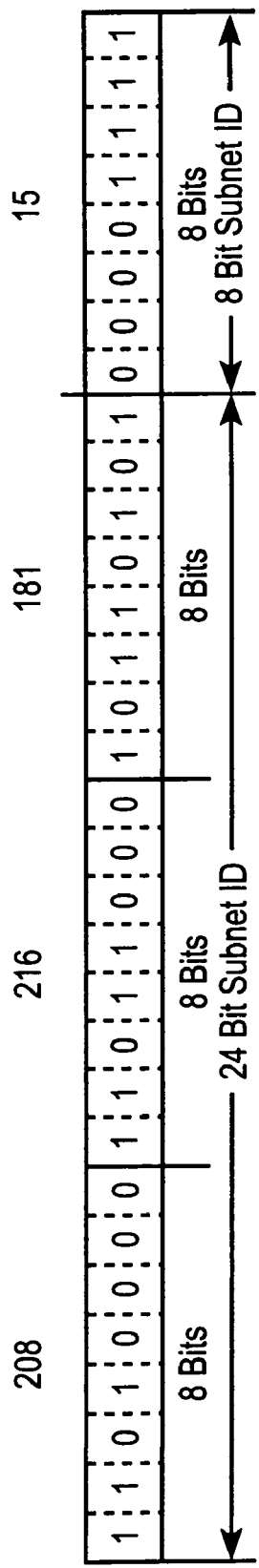
FIG. 4A is a schematic diagram illustrating the structure of an IP address according to one embodiment.

An IP address is a 32-bit value that is usually represented in "dot notation" as four decimal numbers separated by dots (e.g. 208.216.181.15). Each decimal number is a value from 0 to 255 and represents the binary value of one of the four bytes that make up the IP address. FIG. 4A is a schematic diagram illustrating the structure of an IP address according to one embodiment. It shows both the binary and decimal forms of the IP address 208.216.181.15.

An IP address consists of two parts: a subnet ID and a host ID. The subnet ID is the N most significant bits of the IP address while the host ID is the 32−N least significant bits of the IP address. The Classless Internet Domain Routing ("CIDR") notation indicates the number of bits used to represent the subnet ID by appending/N to an IP address. For example, if the 24 most significant bits of the IP address 208.216.181.15 represented the subnet ID, this would be indicated by 208.216.181.15/24. FIG. 4A shows the segregation of the address 208.216.181.15 into subnet ID and host ID portions.

An IP subnet can be used to collectively refer to all of the hosts whose IP addresses have the same subnet ID and any possible host ID within the subnet. An IP subnet is represented in CIDR notation by setting the host ID portion of the address to 0. For example, the subnet 208.216.181.0/24 refers to the range of IP addresses 208.216.181.0 to 208.216.181.255. In modern IP networks the subnet ID portion of the IP address can be any number of bits. For example, the subnet might be 208.216.181.252/30 representing the range of IP addresses from 208.216.181.252 to 208.216.181.255.

Figure 4B:
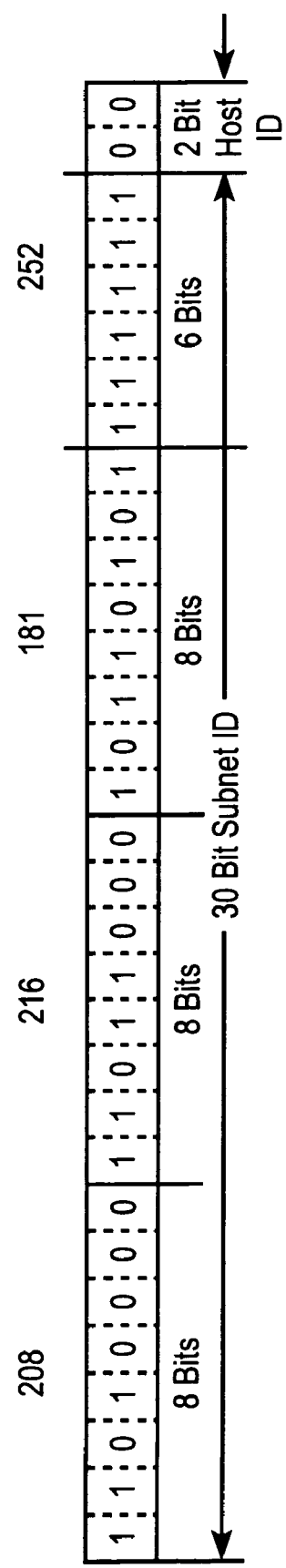
FIG. 4B is a schematic diagram illustrating the structure of an IP address according to one embodiment.

FIG. 4B is a schematic diagram illustrating the structure of an IP address according to one embodiment. It shows the IP subnet 208.216.181.252/30. The first three bytes contain the values 208, 216, and 181. The leftmost 6 bits in the last byte are all set giving a value of 252. Together the first three bytes and the leftmost 6 bits of the fourth byte represent the subnet ID. The host ID is allowed to take on any legal value from 00 to 11, so the valid IP addresses within the 208.216.181.252/30 subnet range from 208.216.181.252 through 208.216.181.255.

IP subnets are a useful form of IP address range for classification. Because of the nature of the IP protocol, the hosts on a LAN are assigned IP addresses from a subnet, so it is convenient to refer to packet traffic originating from or destined to any host on the LAN by its IP subnet. It is common to want to provide the same QoS treatment to groups of packets going from or to any of the hosts in an IP subnet.

In one embodiment, a packet classification method and apparatus accepts a QoS policy input. The method and apparatus may in one embodiment only support classification using a specific set of packet fields and environmental values. Each packet field and environmental value is referred to as a dimension of the classification. For example, the classification method and apparatus described in a copending commonly owned application entitled METHODS AND APPARATUS FOR PACKET CLASSIFICATION WITH MULTIPLE ANSWER SETS, Ser. No. 09/316,466, now U.S. Pat. No. 6,529,508 by Renwei Li, Thomas W. Ng, Paul Terry, and Henry Lee, supports 8-dimensional packet classification based on the following packet fields and environmental values according to one embodiment:

- source IP address from the IP header
- destination IP address from the IP header
- source TCP or UDP port from the TCP or UDP header
- destination TCP and UDP port from the TCP or UDP header
- protocol from the IP header
- type of service from the IP header
- Ack flag from the TCP header
- arrival interface from the environment An example in one embodiment of a classification rule that would be supported by the above method and apparatus is shown in Table I.

TABLE I

Example Classification Rule

| Dimension | Match Value(s) |
|---|---|
| Destination IP Address | 208.216.181.15 |
| Destination TCP or UDP Port | 80 |
| Protocol | TCP |

It should be noted that in one embodiment a classification rule need only contain one term for any dimension, since a term can specify a complex set of match values. An alternative embodiment might have classification rules containing multiple terms for a dimension. Multiple terms for a dimension may trivially be combined into a single term by creating a union of the match values of all the terms. If a classification rule does not contain a term for a supported dimension, there is in one embodiment an implied match with any value. In other words, the dimension is a wild card or "don't care" dimension.

The above classification rule contains 3 terms. In one embodiment, other dimensions are wild card dimensions. For example, a packet having any value of source IP address could match this classification rule. It so happens that this classification rule matches all web browsing traffic (TCP port 80) destined for the web site having the address (208.216.181.15).

Although the verification method and apparatus of this embodiment may be applied to classification rules based upon any set of dimensions supported by a packet classification method and apparatus, the examples below use the 8-dimensional scheme described above.

In one embodiment, the policy verification method and apparatus is to identify classes whose classification rules overlap. Two classification rules overlap if it is possible for a received packet to simultaneously satisfy both rules. There are several types of classification rule overlap that can occur.

The first type of overlap is a partial overlap. Consider the example rules of Table II.

TABLE II

Example Set of Partially Overlapping Classification Rules

| Dimension | Class A Classification Rule Match Values | Class B Classification Rule Match Values |
|---|---|---|
| Source IP Address | 133.45.12.0/24 | 133.45.12.0/24 |
| Destination IP Address | 125.34.56.0/24 | 125.34.56.0/24 |
| Destination TCP or UDP Port | 100–200 | 150–250 |

If a received packet contained a source IP address of 133.45.12.27, a destination IP address of 125.34.56.211, and a destination TCP port of 175, the packet would simultaneously satisfy the classification rules of both class A and class B. Since the Destination TCP or UDP Port match values partially overlap, it is unclear what the intent was of the user who defined the QoS policy. Partial overlaps are usually considered to be an error that should be resolved.

It should be noted that a partial overlap could only occur if two rules have one or more dimensions where the match values partially overlap. Any remaining dimensions should include duplicate or nested (explained below) match values.

If there is a single dimension without an overlap of any type, the rules do not partially overlap. For example, consider the slight variation of the rules of Table II which is presented in Table III.

TABLE III

Example Set of Non-Overlapping Classification Rules

| Dimension | Class A Classification Rule Match Values | Class B Classification Rule Match Values |
|---|---|---|
| Source IP Address | 133.45.11.0/24 | 133.45.12.0/24 |
| Destination IP Address | 125.34.56.0/24 | 125.34.56.0/24 |
| Destination TCP or UDP Port | 100–200 | 150–250 |

The classification rules of Table III do not overlap, because it is not possible for a packet's source IP address to simultaneously satisfy both the class A classification rule and the class B classification rule.

A second type of overlap is a nested overlap. Consider the example rules of Table IV.

TABLE IV

Example Set of Classification Rules With Nested Overlap

| Dimension | Class A Classification Rule Match Values | Class B Classification Rule Match Values |
|---|---|---|
| Source IP Address | 133.45.12.0/24 | 133.45.12.160/27 |
| Destination IP Address | 125.34.56.0/24 | 125.34.56.0/24 |
| Destination TCP or UDP Port | 100–200 | 100–200 |

If a received packet contained a source IP address of 133.45.12.167, a destination IP address of 125.34.56.211, and a destination TCP port of 175, the packet would simultaneously satisfy the classification rules of both class A and class B. It is interesting to note that the source IP address subnet in the class B rule (i.e. 133.45.12.160/27) is completely contained (i.e. nested) within the source IP address subnet in class A rule (i.e. 133.45.12.0/24). The class A IP subnet matches the IP addresses 133.45.12.0 through 133.45.12.255 while the class B IP subnet matches the IP addresses 133.45.12.160 through 133.45.12.191. The class B rule matches a subset of the packets that match the class A rule.

It is not clear whether a nested overlap is an error or not. Some users may, according to one embodiment, specify a protocol for constructing classification rules according to which any overlap is an error. Alternatively, the user may, according to an alternative embodiment, deliberately permit rules having nesting overlap to be created. Any conflict can be resolved by considering the class B rule to be more specific than the class A rule, and giving it precedence over the class A rule.

The latter interpretation is a very useful interpretation, because it would otherwise be necessary, according to one embodiment, for the class A rule to specify two source IP address ranges (133.45.12.0–133.45.12.159 and 133.45.12.192–133.45.12.255) to avoid overlapping the 133.45.12.160/27 subnet. Specifying non-overlapping ranges that align with each other exactly is difficult to do consistently. It is very easy to introduce "off by one" errors. If for example the second of the two class A rule ranges were specified as 133.45.12.193–33.45.12.255, the IP address 133.45.12.192 would not be included in either the second range of the class A rule or the 133.45.12.160/27 subnet of the class B rule. In practice, users are usually establishing classification rules for whole subnets, so working with subnets rather than ranges is more natural.

The classification method and apparatus can be easier to use if it allows more specific classes to take precedence over less specific classes, according to one embodiment. Ultimately the interpretation used may depend on the capabilities of the classification method and apparatus. If the classification method and apparatus chooses to handle nested overlaps using precedence, the overlap may be considered acceptable. The remainder of this specification assumes that nested overlaps are acceptable, according to one embodiment.

It should be noted that a nested overlap can occur if two rules have one or more dimensions where the match values are nested. Any remaining dimensions should include duplicate match values. As in the case of partial overlaps, a single dimension where there is no overlap prevents a nested overlap from occurring.

A third type of overlap is a cyclic nested overlap. Consider the example rules of Table V.

TABLE V

Example Set of Classification Rules With Cyclic Nested Overlap

| Dimension | Class A Classification Rule Match Values | Class B Classification Rule Match Values |
|---|---|---|
| Source IP Address | 133.45.12.0/24 | 133.45.12.160/27 |
| Destination IP Address | 125.34.56.0/24 | 125.34.56.0/24 |
| Destination TCP or UDP Port | 150–250 | 100–300 |

If a received packet contained a source IP address of 133.45.12.167, a destination IP address of 125.34.56.211, and a destination TCP port of 175, the packet would simultaneously satisfy the classification rules of both class A and class B. Here too it is unclear what the intention was of the user who defined the QoS policy. In the source IP address dimension, the class B rule is more specific than the class A rule. For this dimension only, the class B rule is nested inside the class A rule. In the destination TCP or UDP port dimension however, the class A rule is more specific than the class B rule. For this dimension only, the class A rule is nested inside the class B rule. This situation represents a cyclic nested overlap.

Cyclic nested overlaps are usually considered to be an error that should be resolved, since it is unclear what the intent of the user is.

There is another variant of a cyclic nested overlap. Consider the example rules of Table VI.

TABLE VI

Example Set of Classification Rules With Cyclic Nested Overlap

| Dimension | Class A Classification Rule Match Values | Class B Classification Rule Match Values |
|---|---|---|
| Source IP Address | 133.45.12.0/24<br>133.45.13.128/25 | 133.45.12.160/27<br>133.45.13.0/24 |
| Destination IP Address | 125.34.56.0/24 | 125.34.56.0/24 |
| Destination TCP or UDP Port | 100–300 | 100–300 |

If a received packet contained a source IP address of 133.45.12.167, a destination IP address of 125.34.56.211, and a destination TCP port of 175, the packet would simultaneously satisfy the classification rules of both class A and class B. If the source IP address were 133.45.13.129, the packet would also simultaneously satisfy the classification rules of both class A and class B. Notice that the class A rule term for the source IP address dimension specifies two IP subnet match values. The same is true of the corresponding class B rule term. What is interesting is that for this one dimension, a part of the class B rule term is nested within a part of the class A rule term (133.45.12.160/27 is nested inside 133.45.12.0/24) and simultaneously a part of the class A rule term is nested within a part of the class B rule term (133.45.13.128/25 is nested inside 133.45.13.0/24). This situation represents a cyclic nested overlap within a single dimension.

Cyclic nested overlaps in one dimension are usually considered to be an error that should be resolved, since it is unclear what the intent of the user is.

Consider the example rules of Table VII.

TABLE VII

Example Set of Classification Rules With
Cyclic Nested Overlap in Two Dimensions

| Dimension | Class A Classification Rule Match Values | Class B Classification Rule Match Values |
| --- | --- | --- |
| Source IP Address | 133.45.12.0/24 | 133.45.12.160/27 |
| | 133.45.13.128/25 | 133.45.13.0/24 |
| Destination IP Address | 125.34.56.0/24 | 125.34.56.0/24 |
| Destination TCP or UDP Port | 150–250 | 100–300 |

The rules of Table VII represent a combination of a cyclic nested overlap in one dimension (source IP address) and a cyclic nested overlap in two dimensions (source IP address and destination TCP or UDP port). The two dimension cyclic nested overlap occurs because the class B source IP subnet of 133.45.12.160/27 is more specific than the class A source IP subnet of 133.45.12.0/24 while the class A destination TCP or UDP port range of 150–250 is more specific than the class B port range of 100–300.

It should be noted that a cyclic nested overlap can occur if two rules, 1 and 2, have at least one dimension for which rule 1 is nested inside rule 2 and at least one dimension for which rule 2 is nested inside rule 1. A multi-dimensional cyclic overlap (first variant) occurs when at least two different dimensions are involved. A uni-dimensional cyclic overlap (second variant) occurs when only a single dimension is involved. Combinations of the two variants are also possible.

A fourth type of overlap is a duplicate. Consider the example rules of Table VIII.

TABLE VIII

Example Set of Classification Rules With Duplication

| Dimension | Class A Classification Rule Match Values | Class B Classification Rule Match Values |
| --- | --- | --- |
| Source IP Address | 133.45.12.0/24 | 133.45.12.0/24 |
| Destination IP Address | 125.34.56.0/24 | 125.34.56.0/24 |
| Destination TCP or UDP Port | 100–200 | 100–200 |

Any received packet that matches the class A rule will also match the class B rule, because they are identical. Duplicate rules are usually considered to be an error. The only mitigating circumstance would be if class A were a duplicate of class B in all respects. In such a case, one could consider silently deleting one of the classes, according to one embodiment. If there is any disparity at all between the classes, it may be concluded that there is an error. The remainder of this specification assumes that duplicate rules are an error, according to one embodiment.

It should be noted that a duplicate can occur if two rules have the same match values for every dimension. As in the case of partial overlaps, a single dimension where there is no overlap prevents a duplicate from occurring.

Figure 5:
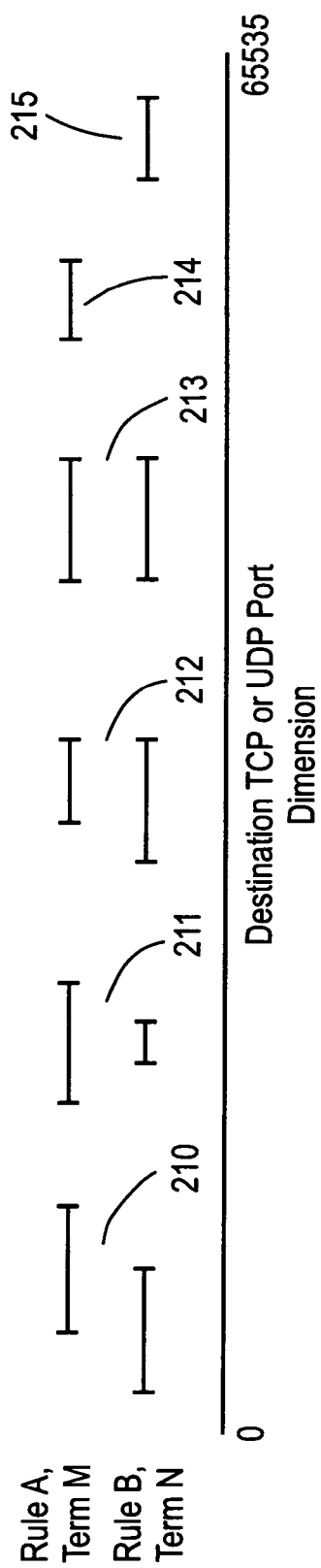
FIG. 5 is a schematic diagram illustrating various conditions of overlap between match values for two rules according to one embodiment.

The above discussion has only considered the simplest situations involving partial overlaps, nested overlaps, cyclic overlaps, and duplicates. When rule terms contain multiple match values, more complicated overlap situations can result. FIG. 5 is a schematic diagram illustrating various conditions of overlap between match values for two rules according to one embodiment. It shows different possibilities for two terms M and N belonging respectively to rules A and B. The bottom line in FIG. 5 indicates the full legal range of values for the Destination TCP or UDP Port classification dimension. The two ranges 210 partially overlap. The two ranges 211 are involved in a nested overlap where the term N range is nested inside the term M range. The two ranges 212 are involved in a nested overlap where the term M range is nested inside the term N range. The two ranges 213 are duplicates. The two ranges 214 and 211 and non-overlapping. If individual constant values and IP subnets are considered to be variants of a range, FIG. 5 shows all possible types of overlap and non-overlap. In actual rules, according to one embodiment, these overlaps and non-overlaps can occur in any combination.

Figure 6A:
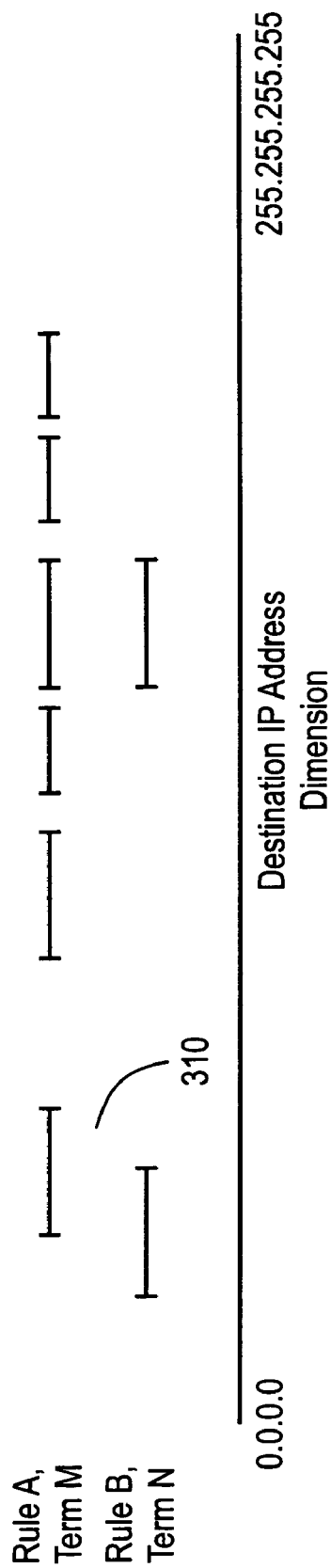
FIG. 6A is a schematic diagram illustrating partial overlap between two match terms according to one embodiment.

FIG. 6A is a schematic diagram illustrating partial overlap between two match terms according to one embodiment. It shows two terms that partially overlap. Any time that two terms have two ranges 310 that partially overlap, the terms are considered to overlap. It does not matter what other types of overlap or non-overlap are present.

Figure 6B:
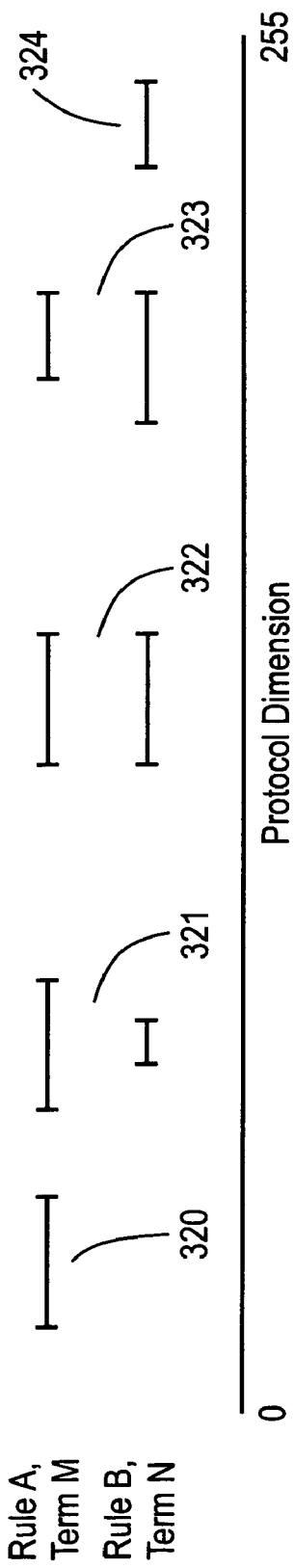
FIG. 6B is a schematic diagram illustrating partial overlap between two match terms according to one embodiment.

FIG. 6B is a schematic diagram illustrating partial overlap between two match terms according to one embodiment. It shows a subtler situation where two terms partially overlap. If a term M contains a range 320 and both terms contain two ranges 323 where the term M range is nested inside the term N range, the two terms partially overlap. A partial overlap also occurs for the symmetrical situation involving ranges 321 and 324. The presence of duplicate ranges 322 does not affect the outcome.

Figure 7A:
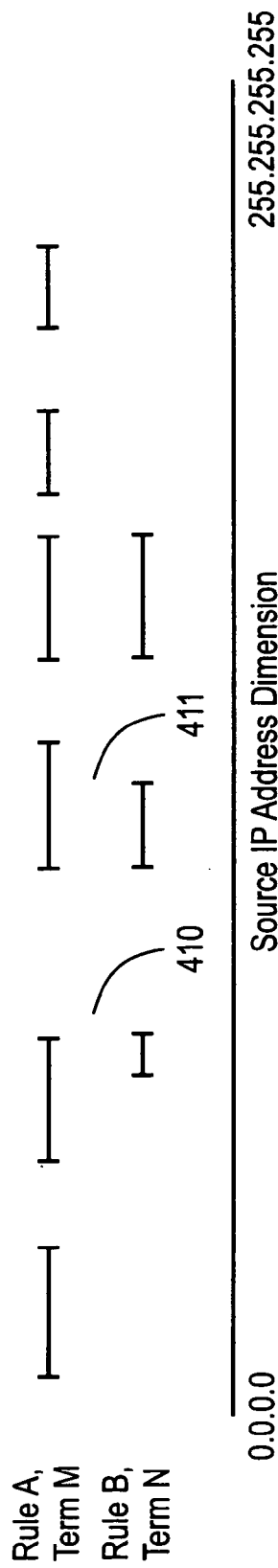
FIG. 7A is a schematic diagram illustrating nested overlap between two match terms according to one embodiment.

FIG. 7A is a schematic diagram illustrating nested overlap between two match terms according to one embodiment. It shows two terms involved in a nested overlap. The two ranges 410 establish the minimum condition for a nested overlap. Additional ranges in term M may be present as long as they do not overlap or duplicate ranges in term N. Additionally there may be other ranges 411 involved in a nested overlap, but the ranges of term N are nested inside the ranges of term M if the first pair of ranges 410 had that nesting.

Figure 7B:
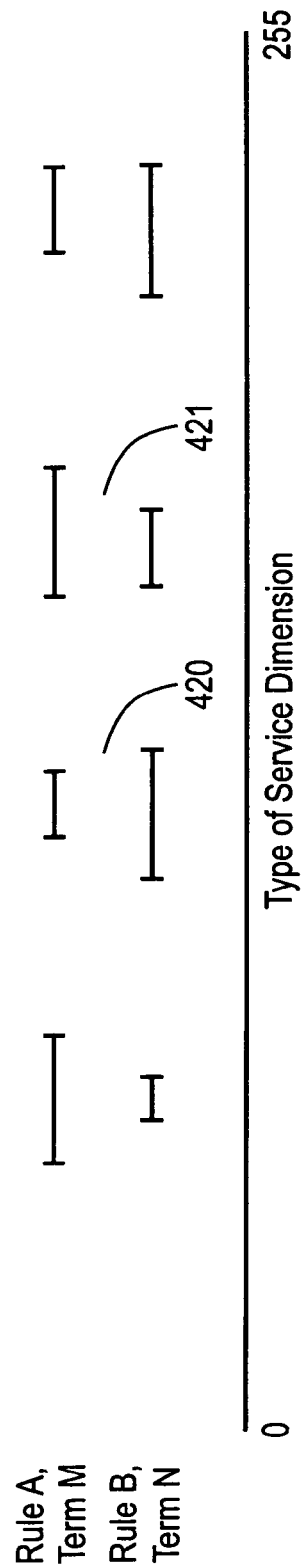
FIG. 7B is a schematic diagram illustrating cyclic nested overlap between two match terms according to one embodiment.

FIG. 7B is a schematic diagram illustrating cyclic nested overlap between two match terms according to one embodiment. It shows two terms involved in a cyclic nested overlap. The four ranges 420 and 421 establish the minimum condition for a cyclic nested overlap. Other ranges involved in nested overlaps or duplicates may also be present.

FIG. 8 is a schematic diagram illustrating duplication between match terms according to one embodiment. It shows two terms that are duplicates. Every range in term M is a duplicate of a range in term N.

A QoS policy in one embodiment typically specifies multiple classes. Any of the above types of error can occur in a policy. If a QoS policy has only a small number of classes, it is likely that an error will be noticed. As the size of the QoS policy grows, it becomes more likely that errors will occur without being noticed.

The probability of an error increases dramatically if the policy server or router allows an overall QoS policy to be constructed as a set of multiple smaller QoS policies. For example, a policy server might have a separate QoS policy for each organization using the network. A router might have a separate QoS policy for each interface.

QoS policies typically change over time. For example, a business organization may use one policy during the normal working hours of a business day. It may use a different policy during non-working hours. A third policy may be used during holidays. Policies may be activated for use for a fixed interval or they may be activated on a recurring schedule (e.g. from 9 AM to 5 PM every weekday).

Figure 9:
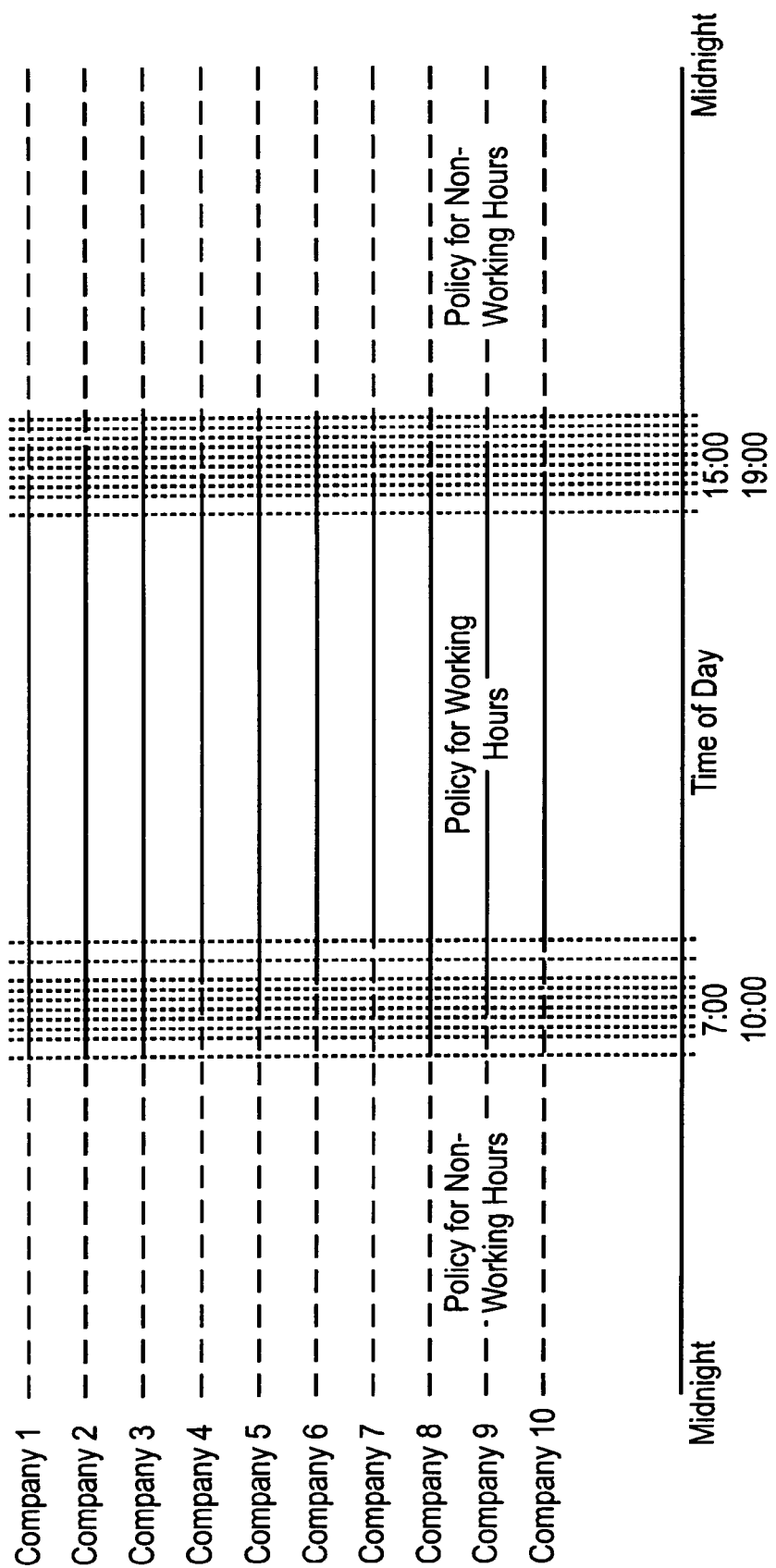
FIG. 9 is a schematic diagram illustrating policies going into effect and discontinuing according to one embodiment.

Consider a scenario where a policy server has policies for a large number of business organizations. FIG. 9 is a schematic diagram illustrating policies going into effect and discontinuing according to one embodiment. Each of the policies may activate and deactivate during a normal business day. One can see that during the period from 3 PM to 7 PM, a large number of "working hours" policies are deactivated. The rate at which these policies are deactivated peaks at around 5 PM, and tapers off as 7 PM approaches. As each policy is deactivated, it is replaced by a non-working hours policy for the organization. If one breaks the interval between 3 PM and 7 PM up into intervals whose endpoints are times when a policy activates or deactivates, there may be hundreds of intervals. During each interval a different set of policies (covering all of the organizations) will be active. Each of these sets of rules should be verified, as there may be errors due to overlaps between policies.

Upon initial consideration, the problem of verifying a set of policies would seem to be trivial. If a set of policies contains N classes overall, it is only necessary to start with the first class and compare its classification rules with the classification rules of each other class to verify that there are no impermissible overlaps. Once the first class is completed, the verification could proceed to the second class. Verification would proceed until each pair of classes had been verified.

The magnitude of the problem starts to be appreciated if one calculates how many classes have to be compared. If each of N classes is compared to the N−1 other classes, the number of class comparisons is:

$$NumberOfComparisons = \frac{N \times (N-1)}{2}$$

The factor of 2 arises because it is not necessary to compare class j to class i, after class i has already been compared to class j. As can be seen, the number of class comparisons is $O(N^2)$. If there were 1000 classes, 499,500 class comparisons would be required.

If all of the classes have only one classification rule, the number of rule comparisons is no greater than the number of class comparisons. If two classes A and B have respectively 3 and 2 classification rules, each of the 3 rules should be compared to the 2 rules for 6 comparisons in total. In general, if the average number of classification rules per class is R, the number of rule comparisons per pair of classes will be $R^2$. Overall, the number of rule comparisons will be:

$$NumberOfRuleComparisons = R^2 \times \frac{N \times (N-1)}{2}$$

When two rules are compared, it is necessary to compare the corresponding rule terms of each dimension. If the number of dimensions supported by the classification method and apparatus is D, then D rule term comparisons will be required. Even more would be required if a rule allowed multiple rule terms for each dimension. In one embodiment, comparisons are performed for all dimensions, even those that are a wild card dimension for a rule. Nested overlaps are very common when a rule has wild card dimensions. The total number of rule term comparisons will be:

$$NumberOfRuleTermComparisons = D \times R^2 \times \frac{N \times (N-1)}{2}$$

For 1000 classes, an average of 2 classification rules per class, and 8 dimensions, 15,984,000 term comparisons are required.

It should be kept in mind that each rule term comparison is more complicated than simply comparing two numbers. Rule terms in one embodiment contain a potentially complex set of match values. The match values may consist of any combination of individual constant values, ranges of constant values, and IP subnets. Each of the three types of overlap need to recognized. Each term comparison is likely to require multiple value comparisons and temporary records to track the detected overlaps as rule comparison progresses.

Even for a modern computer, nearly 16 million moderately complex comparisons will take a considerable amount of time to perform. When these comparisons have to be repeated for 20 sets of policies, the number of comparisons increases very rapidly. If the number of rules increases, verification using the "trivial" approach of pairwise comparison quickly becomes unfeasible.

Figure 10:
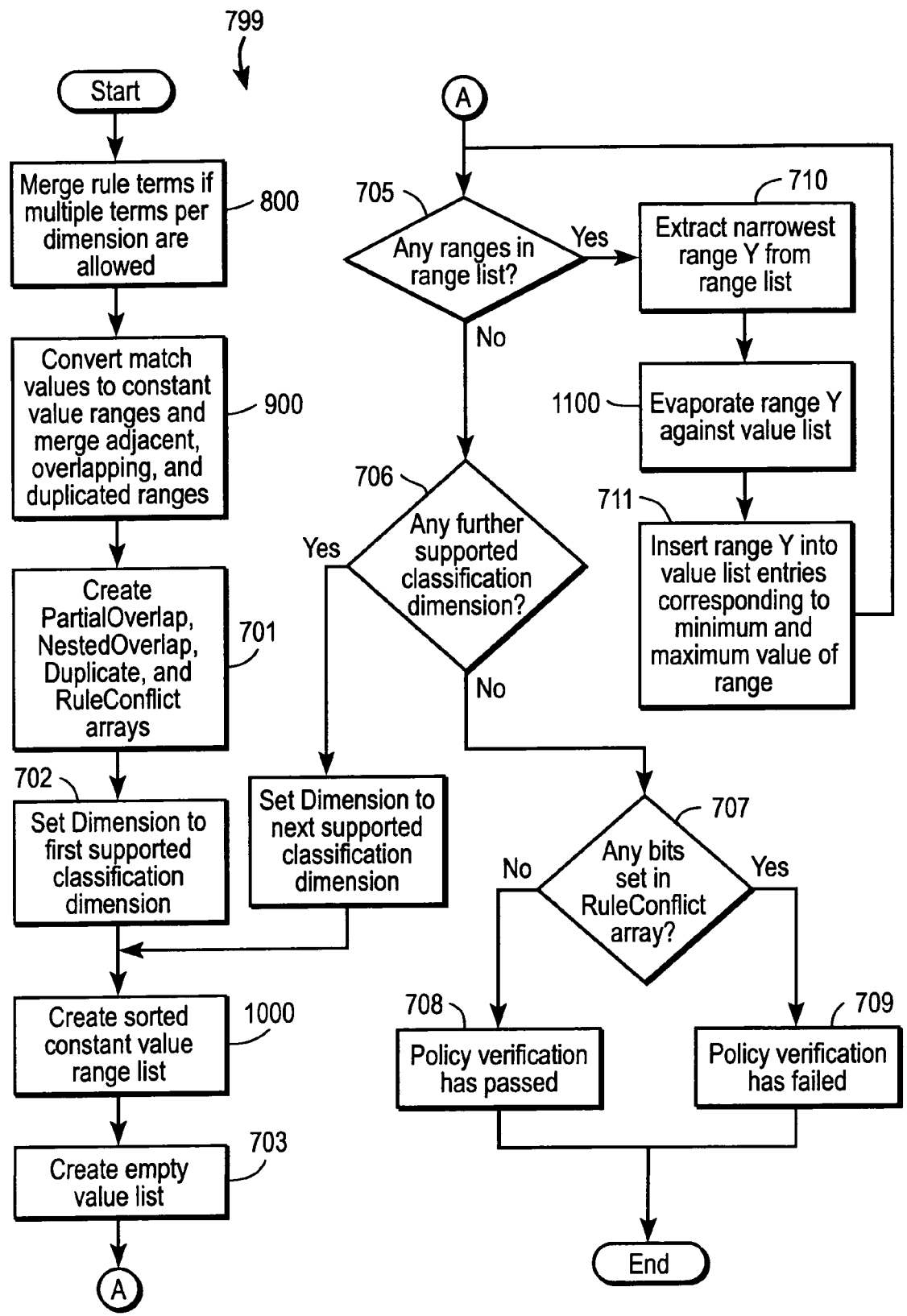
FIG. 10 is a flow diagram illustrating a method for policy verification according to one embodiment.

In one embodiment, the policy verification method and apparatus take as input a set of one or more policies to be verified. In one embodiment, each policy includes one or more classes. In one embodiment, each class specifies one or more classification rules that identify packets belonging to the class. In one embodiment, each classification rule has one or more terms. A classification rule may not, in one embodiment, contain terms for all supported dimensions. Where a term for a dimension is missing, it is assumed in one embodiment that any value for the dimension satisfies the rule. In one embodiment, each term includes a set of one or more match values. The match values can in one embodiment be any number of single constant values, ranges of constant values, and, for IP address dimensions, IP subnets in CIDR notation. FIG. 10 is a flow diagram illustrating a method for policy verification according to one embodiment. It illustrates process blocks in a method 799 according to one embodiment. Method 799 is preferably performed automatically in a programmed computer apparatus in one embodiment.

Figure 11:
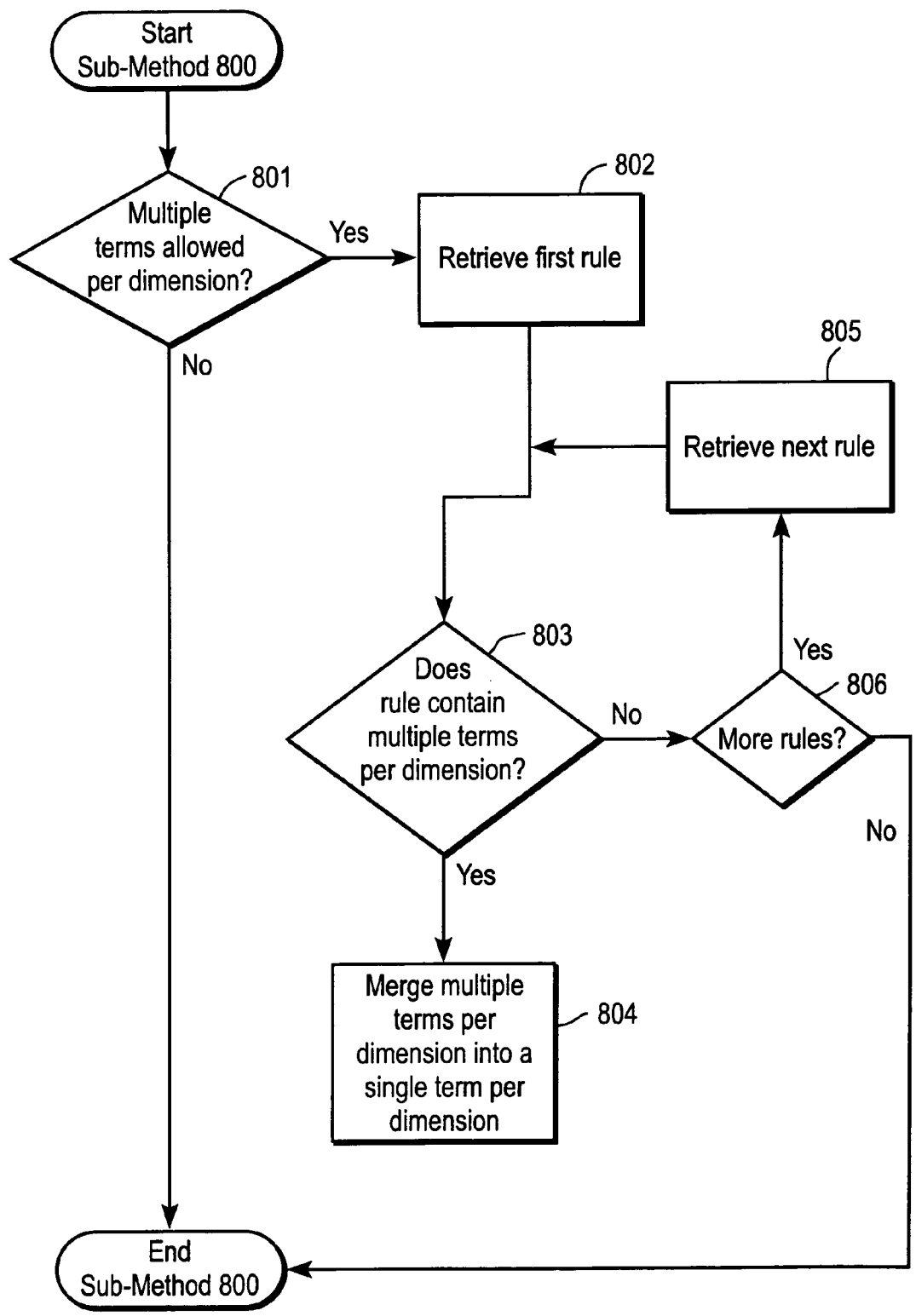
FIG. 11 is a flow diagram illustrating a method for merging rule terms according to one embodiment.

FIG. 11 is a flow diagram illustrating a method for merging rule terms according to one embodiment. If the classification method and apparatus allows a classification rule to contain multiple terms for a single dimension, sub-method 800 (FIG. 10) including process blocks 801–806 (FIG. 11) of method 799 is performed in one embodiment to merge the multiple terms into a single term by creating a single set of match values as a union of the sets of match values from all of the terms for the dimension. If the classification method and apparatus does not allow a classification rule to contain multiple terms for a single dimension (process block 801), sub-method 800 can be omitted in one embodiment.

Figure 12:
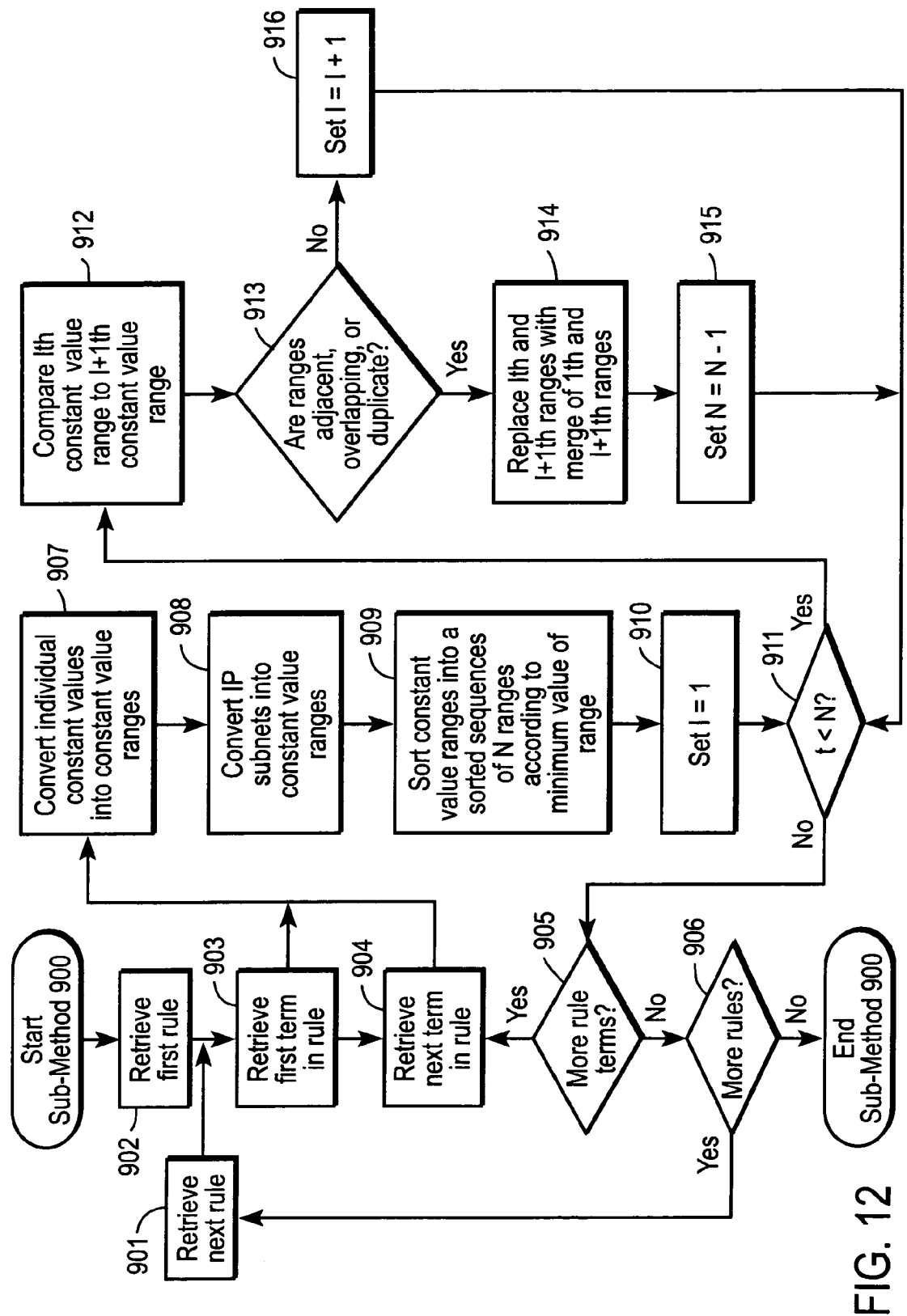
FIG. 12 is a flow diagram illustrating a method for converting match values to constant value ranges and merging adjacent, overlapping, and duplicate ranges according to one embodiment.

FIG. 12 is a flow diagram illustrating a method for converting match values to constant value ranges and merging adjacent, overlapping, and duplicate ranges according to one embodiment. Sub-method 900 (FIG. 10) which includes process blocks 901–916 (FIG. 12) is performed in one embodiment to convert all match values into constant value ranges and to merge any duplicate, overlapping, and adjacent constant value ranges in each term. Sub-method 900 proceeds in one embodiment by iterating through each rule (process blocks 901, 902, and 906) and each term within a rule (process blocks 903–905). Conversion and merging is performed separately for each rule term.

By converting all match values to constant value ranges, subsequent processing is simplified since only one type of match value needs to be considered. Individual constant values are converted in one embodiment to a range with the minimum value identical to the maximum value (process block 907). In one embodiment, IP subnets are converted to a range such that the minimum value is the IP address in the subnet with a host ID of 0 and the maximum value is the IP address in the subnet with a host ID of $2^N-1$ where N is the number of bits used for host IDs in the subnet (process block 908).

Merging duplicate, overlapping, and adjacent constant value ranges further simplifies subsequent processing, because partial overlaps, nested overlaps, and duplication between rule terms are easier to analyze if the match values are as simple as possible. For example, a classification rule term for the destination TCP or UDP port dimension might contain two ranges 50–150 and 125–225. If another rule term for the same dimension contained the range 75–200, it might incorrectly be considered to partially overlap the first term since 75–200 partially overlaps both 50–150 and 125–225. The two ranges in the first term can be merged however into a single range 50–225. It then becomes obvious that the second term's range of 75–200 is nested inside the first term's merged range of 50–225.

Most terms will have a single constant value range, so no merging is required. The probability that a term will contain M constant value ranges drops rapidly with increasing M. In most cases, merging will be quite simple.

In one embodiment, a term's constant value ranges are sorted into a sequence according to the minimum value of the range (process block 909). Starting with the first constant value range in the sequence (process block 910), it is compared with the second constant value range in the sequence (process block 912). If the constant value ranges are duplicates, partially overlap, or are adjacent (process block 913), the two constant value ranges are merged into a single constant value range that replaces the first and second constant value ranges in the sequence as the new first constant value range in the sequence (process block 914 and 915). The first constant value range in the sequence is iteratively compared with the second constant value range in the sequence (iteration due to process block 911) and merged until the second constant value range in the sequence is not a duplicate, does not partially overlap, and is not adjacent to the first constant value range (process block 913).

In one embodiment, the second constant value range in the sequence (process block 916) is now compared with the third constant value range in the sequence (process block 912). If the constant value ranges are duplicates, partially overlap, or are adjacent (process block 913), the two constant value ranges are merged into a single constant value range that replaces the second and third constant value ranges in the sequence (process block 914 and 915). Comparison (iteration due to process block 911) and merging continues until the second constant value range can't be merged with the third constant value range (process block 913) and comparison and merging of the third and fourth constant value ranges commences (process block 916).

Iterative comparison and merging of adjacent pairs of constant value ranges in the sequence continues in one embodiment until the second last constant value range is compared to and possibly merged with the last constant value range in the sequence. Once comparison and merging completes (process block 911 results in "No"), comparison and merging proceeds to the next term in the rule (process blocks 905 and 904).

A merge of adjacent pairs of constant value ranges may in one embodiment occur in the situations shown in Table IX. Examples for each situation indicate what the result of merging will be. For clarity, the example situations are shown without conversion of individual constant values and IP subnets to constant value ranges.

TABLE IX

Examples of merging

| Situation | Examples |
| --- | --- |
| Duplicate single values | 11 and 11 ⇒ 11; 133.45.12.167 and 133.45.12.167 ⇒ 133.45.12.167 |
| Duplicate ranges | 10–20 and 10–20 ⇒ 10–20; 133.45.12.162–133.45.12.166 and 133.45.12.162–133.45.12.166 ⇒ 133.45.12.162–133.45.12.166 |
| Duplicate IP subnets | 133.45.12.0/24 and 133.45.12.0/24 ⇒ 133.45.12.0/24 |
| Overlapping single value and range | 10 and 10–20 ⇒ 10–20; 133.45.12.162 and 133.45.12.162–133.45.12.166 ⇒ 133.45.12.162–133.45.12.166; 10–20 and 15 ⇒ 10–20; 133.45.12.162–133.45.12.166 and 133.45.12.164 ⇒ 133.45.12.162–133.45.12.166 |
| Overlapping single value and IP subnet | 133.45.12.0 and 133.45.12.0/24 ⇒ 133.45.12.0/24; 133.45.12.0/24 and 133.45.12.161 ⇒ 133.45.12.0/24 |
| Overlapping ranges | 10–20 and 15–25 ⇒ 10–25; 10–30 and 15–25 ⇒ 10–30; 133.45.12.162–133.45.12.166 and 133.45.12.164–133.45.12.168 ⇒ 133.45.12.162–133.45.12.168; 133.45.12.162–133.45.12.192 and 133.45.12.164–133.45.12.168 ⇒ 133.45.12.162–133.45.12.192 |
| Overlapping range and IP subnet | 133.45.12.155–133.45.12.164 and 133.45.12.160/27 ⇒ 133.45.12.155–133.45.12.191; 133.45.12.160/27 and 133.45.12.162–133.45.12.166 ⇒ 133.45.12.160/27 |
| Overlapping IP subnets | 133.45.12.0/24 and 133.45.12.160/27 ⇒ 133.45.12.0/24 |
| Adjacent single value and range | 9 and 10–20 ⇒ 9–20; 133.45.12.161 and 133.45.12.162–133.45.12.166 ⇒ 133.45.12.161–133.45.12.166; 10–20 and 21 ⇒ 10–21; 133.45.12.162–133.45.12.166 and 133.45.12.167 ⇒ 133.45.12.162–133.45.12.167 |
| Adjacent single value and IP subnet | 133.45.11.255 and 133.45.12.0/24 ⇒ 133.45.11.255–133.45.12.255; 133.45.12.0/24 and 133.45.13.0 ⇒ 133.45.12.0–133.45.13.0 |
| Adjacent ranges | 10–20 and 21–30 ⇒ 10–30; 133.45.12.162–133.45.12.166 and 133.45.12.167–133.45.12.172 ⇒ 133.45.12.162–133.45.12.172 |
| Adjacent range and IP subnet | 133.45.11.155–133.45.12.159 and 133.45.12.160/27 ⇒ 133.45.11.155–133.45.12.191; 133.45.12.160/27 and 133.45.12.192–133.45.12.200 ⇒ 133.45.12.160–133.45.12.200 |
| Adjacent IP subnets | 133.45.11.0/24 and 133.45.12.0/24 ⇒ 133.45.11.0–133.45.12.255; 133.45.0.0/24 and 133.45.1.0/24 ⇒ 133.45.0.0/23 |

Merging of constant value ranges in sub-method 900 of method 799 may be omitted in one embodiment if the method used to define classification rules ensures that terms cannot contain adjacent, duplicate, or partially overlapping match values.

In one embodiment, upon completion of sub-method 900, method 799 proceeds to create the data structures that will be needed to compare classification rules (process block 701 in FIG. 10). The total number of classification rules in all policies is determined. Henceforth it will be assumed, according to one embodiment, that the total number of rules is N. Each rule is assigned a number from 1 to N. If the policy verification method and apparatus is implemented in software, it may be more efficient in one embodiment to number classification rules from 0 to N−1 depending on the programming language used.

In one embodiment, three N×N arrays are created. These arrays record respectively: partial overlaps of rule terms; nested overlaps of rule terms; and, duplicate rule terms. Each array records a final conclusion made regarding a pair of terms. One of the arrays will record the final conclusion. In other words, while it is possible for multiple ranges in two terms to simultaneously experience partial overlaps, nested overlaps, and duplicates, the terms themselves can only be involved in one type of overlap. This was explained above with the aid of FIGS. 5 through 8. Once a conclusion has been reached about a pair of terms, it will not be necessary to reconsider that conclusion. Many of the tests, described later in this specification to detect various overlap situations take advantage of this finality of a conclusion to avoid needless testing.

In one embodiment, each dimension of the three arrays is indexed with a rule number. Each array provides two entries for each pair of rules. For example, the entries in the duplicate array for rules 12 and 37 are:

Duplicate[12, 37]
Duplicate[37, 12]

In one embodiment, each entry in the three arrays is a bit vector. The bit vector contains one bit for each packet classification dimension. For the example packet classification method and apparatus described above, 8 bits (one byte) is required for the bit vector. Additional or fewer bits may be required depending on the dimensions supported by the packet classification method and apparatus.

In one embodiment, one possible association between the example packet classification dimensions and the bits in the bit vector would be:

source IP address from the IP header (bit 1)
destination IP address from the IP header (bit 2)
source TCP or UDP port from the TCP or UDP header (bit 3)
destination TCP or UDP port from the TCP or UDP header (bit 4)
protocol from the IP header (bit 5)
type of service from the IP header (bit 6)
Ack flag from the TCP header (bit 7)
arrival interface from the environment (bit 8)

In one embodiment, a bit is set in a bit vector if the condition represented by the array (e.g. a duplicate rule term) exists for the indicated pair of rules, and more specifically, the pair of terms in the pair of rules for the indicated dimension. For example, if the source IP address terms of rules 12 and 37 are duplicates, the first bit in the bit vector of Duplicate[12, 37] is set.

It can be seen that each classification dimension can be assigned an index into the bit vector of an array entry. For the example classification method and apparatus which has 8 dimensions, this index will fall into the range of 1 to 8 or in the range of 0 to 7 depending on the implementation technology.

In all three arrays, according to one embodiment, the entries on the diagonal (i.e. Duplicate[X, X]) are not used, because there is no need to compare a rule to itself.

For the recording of nested overlaps, two array entries are used in one embodiment for each pair of rules numbered A and B. A bit set in the [A, B] entry indicates that a term in rule A is nested in the corresponding term of rule B. Similarly, a bit set in the [B, A] entry indicates that a term in rule B is nested in the corresponding term of rule A. Cyclic nested overlaps in one and multiple dimensions may be detected by comparing the [A, B] and [B, A] entries.

For the recording of partial overlaps and duplicates in one embodiment, a single array entry is used for a pair of rules. One half of the array can be used if the lower numbered rule of a pair of rules is used as the row index. In other words, if there are two rules numbered A and B, the entry [A, B] is used if A<B and the entry [B, A] is used if B<A. In the remainder of the description, this entry will be designated as entry [ABmin, ABmax].

If only one half of the N×N array is used, it is possible to optimize the use of storage in one embodiment by using a one-dimension array instead. The size of this array would be:

$$ArraySize = \frac{(N^2 - N)}{2}$$

N is subtracted from $N^2$ to remove the size of the unused diagonal entries.

This optimization can save a substantial amount of memory. The example packet classification method and apparatus requires that each array entry be one byte in size to handle 8 dimensions. If there were 1000 rules, an N×N array would consume 1 MB of memory. The optimization reduces the memory usage to 499,500 bytes (i.e. 0.5 MB).

If rules and array entries are numbered from 0 to N−1, and there are two rules numbered A and B, where A<B, the entry in the one-dimension array for the pair of rules may be located by the index:

$$ArrayIndex = A \times (N - 1) - \left(\frac{A^2 + A}{2}\right) + B - 1$$

If rules and array entries are numbered from 1 to N, and there are two rules numbered A and B, where A<B, the entry in the one-dimension array for the pair of rules will be:

$$ArrayIndex = (A - 1) \times (N - 1) - \left(\frac{A^2 - A}{2}\right) + B - 1$$

The three arrays are initialized in one embodiment such that all bits in all entries are reset (i.e. binary 0). A fourth array is created in one embodiment to record conflicts between pairs of rules. The fourth array is identical to the partial overlap and duplicate arrays except that each array entry may be only a single bit rather than a bit vector. The RuleConflict[12, 37] entry will be set to a logical value of 1 if rules 12 and 37 have a conflict. Each entry is initialized to 0 to indicate that there are no conflicts.

In one embodiment, the remainder of policy verification method 799 (sub-method 1000, process block 703, process block 705, process block 710, sub-method 1100, and process block 711) is performed iteratively for each supported classification dimension (process blocks 702, 704, and 706). In one embodiment, the remainder of the policy verification method involves examining rule terms for the current classification dimension to identify partial overlaps, nested overlaps, and duplicates.

Figure 13:
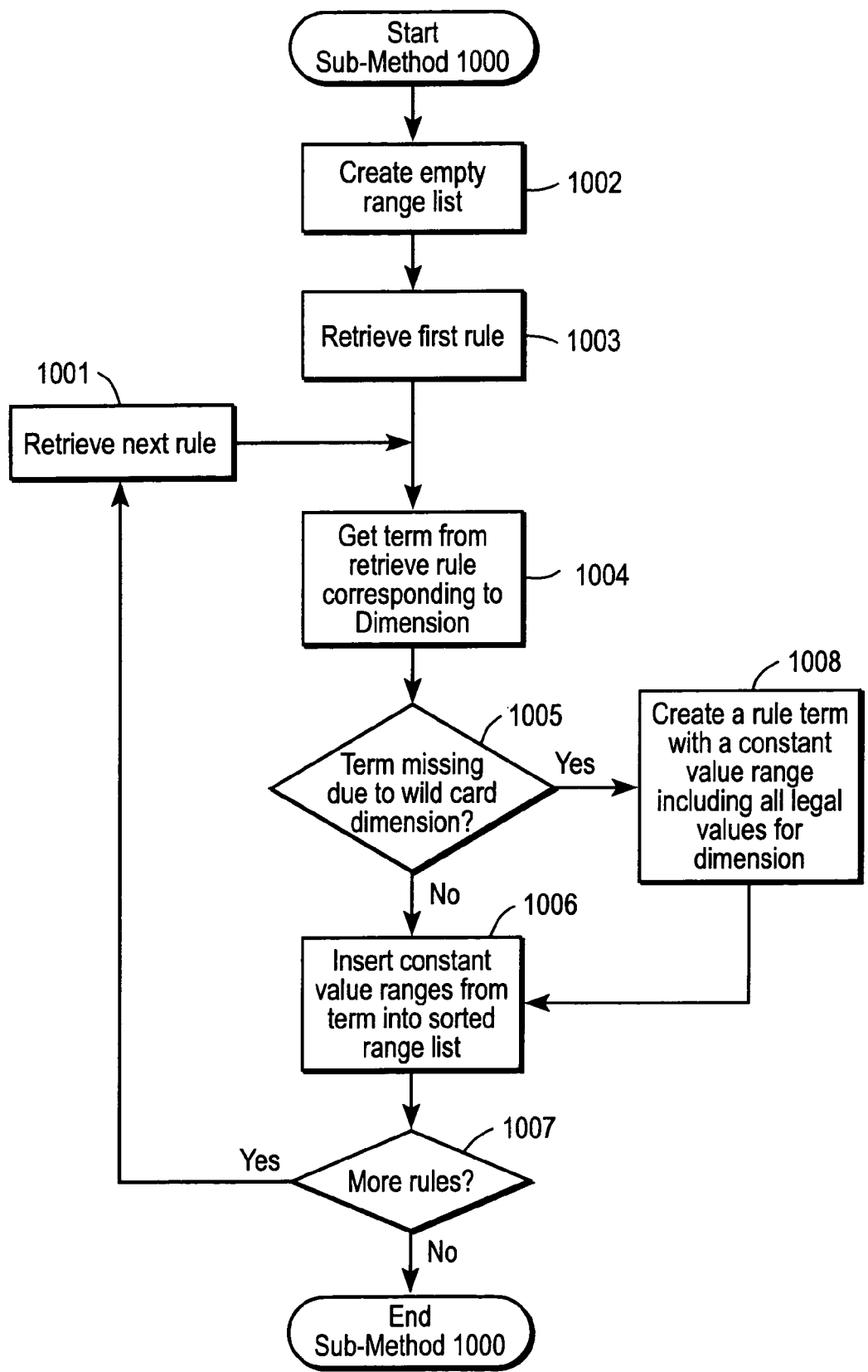
FIG. 13 is a flow diagram illustrating a method for creating a sorted constant value range list according to one embodiment.

FIG. 13 is a flow diagram illustrating a method for creating a sorted constant value range list according to one embodiment. For the current classification dimension, the policy verification method performs sub-method 1000 (FIG. 10) which includes process blocks 1001–1008 (FIG. 13) to create a sorted range list.

An empty range list is created in one embodiment to hold constant value ranges (process block 1002). The range list may be any type of data structure that supports sorting of entries upon insertion and reading of entries in ascending sort order. The selected data structure will ideally support an O(N log N) or better insertion sort. For example, either a B-tree or a skip list would be suitable.

The sort order that will be used for the range list will be width of the range in one embodiment. For example, the range 20–30 (width 11) will be inserted into the range list after the range 55–60 (width 6), but before the range 50–61 (width 12).

For each rule (process blocks 1001, 1003, and 1007), the term corresponding to the current classification dimension is processed (process block 1004) in one embodiment. If a rule does not have a term for the current dimension (i.e. a don't care dimension for the rule) (process block 1005), a term is created consisting of a single constant value range that contains all legal values for the current dimension (process block 1008). For example, the protocol dimension has legal values from 0 to 255. If a term had to be created for this dimension, it would contain the constant value range 0–255.

The constant value ranges of each term are inserted into the range list (process block 1006). In one embodiment, the resulting range list will contain all constant value ranges sorted by width.

In one embodiment, each constant value range in the range list is associated with the rule term and the rule from which the range originated. This can be accomplished by inserting a data structure in the range list that contains the minimum value of the range, the maximum value of the range, and the rule ID from which the range originated. The rule term can be identified using the current classification dimension and the rule ID. Once sub-method 1000 is completed, policy verification method 799 in one embodiment inserts constant value ranges from the range list into a value list in order of increasing range width. As each constant value range is added, it is compared to ranges previously added to the value list to detect partial overlaps, nested overlaps, and duplicates.

In one embodiment, an empty value list is created (process block 703 in FIG. 10). The value list is a data structure whose entries correspond to legal values of the current classification dimension. The value list could be an array that contains an entry for all of the legal values. This would be appropriate for dimensions with a limited number of legal values. For example, the type of service classification dimension has 256 legal values. The value list could also be a sparse data structure (e.g. a B-tree or a list) in which entries are only created as needed. This would be appropriate for dimensions with a large number of legal values. For example, the source IP address classification dimension has $2^{32}$ legal values.

Method 799 allows a different type of data structure to be used for the value list for different classification dimensions in an alternative embodiment. A simple array will provide more efficient access to entries, while a B-tree or list will conserve memory.

Each entry in the value list in one embodiment contains a list of constant value ranges whose minimum value and/or maximum value is identical to that of the value list entry. Initially each entry in the value list will contain an empty list of ranges.

Figure 14:
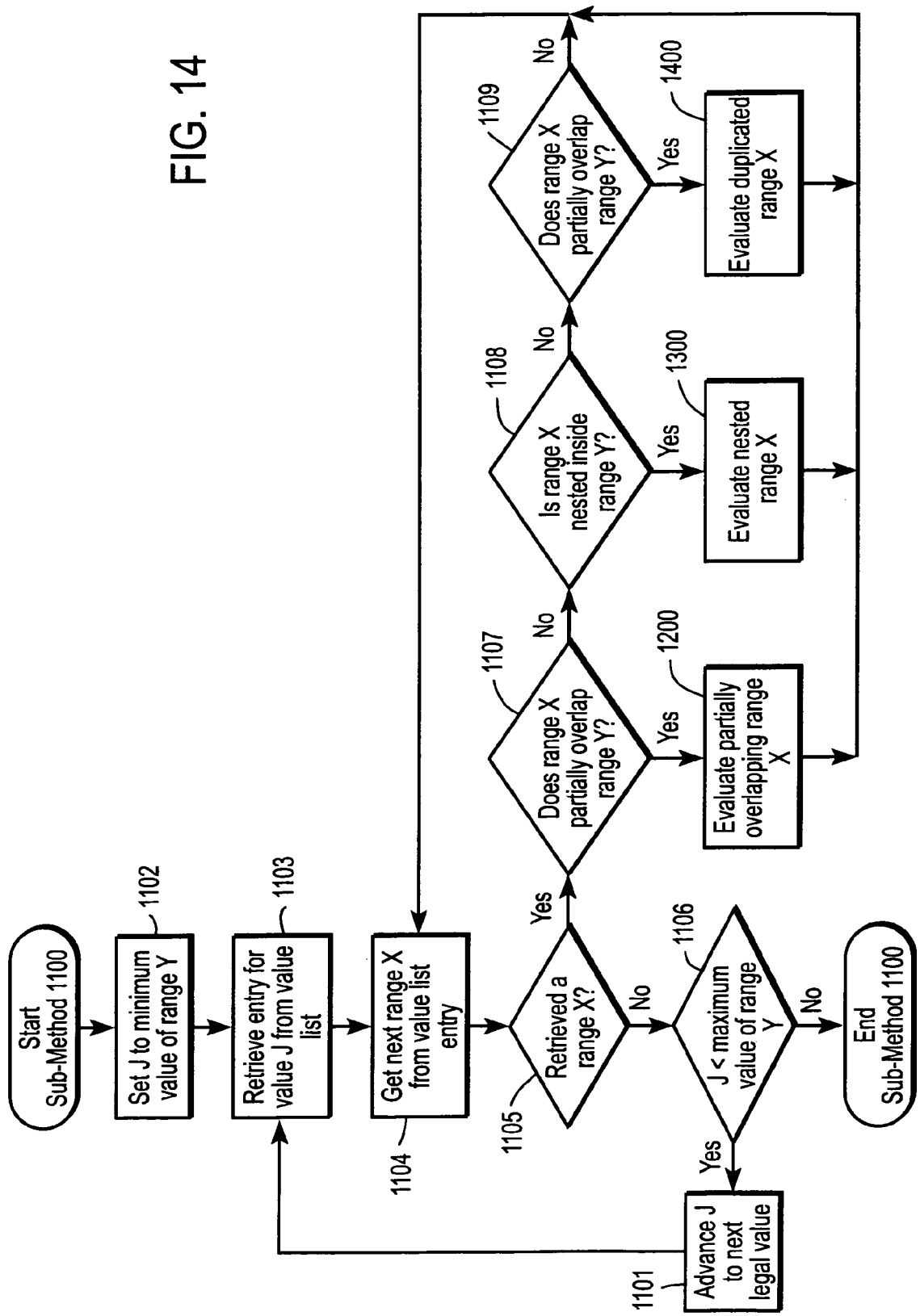
FIG. 14 is a flow diagram illustrating a method for evaluating a narrowest range from a range list against a value list according to one embodiment.

FIG. 14 is a flow diagram illustrating a method for evaluating a narrowest range from a range list against a value list according to one embodiment. Starting with the narrowest range in the range list, and proceeding towards increasingly wider ranges in the range list (process blocks 705 and 710), each constant value range in the range list created by sub-method 1000 is evaluated against the value list by performing sub-method 1100 which includes process blocks 1101–1109 and sub-methods 1200, 1300, and 1400 (FIG. 14).

For each constant value range Y from the range list, the value list entries from the minimum value of the range Y to the maximum value of the range Y inclusive are examined (process blocks 1101–1103 and 1106). Each value list entry is examined to see if its list of ranges contains any constant value ranges (process blocks 1104 and 1105). Each constant value range X contained in a value list entry's list of ranges is compared to constant value range Y (process blocks 1107–1109).

Once all of the ranges X have been compared to range Y, constant value range Y is inserted into the list of ranges contained in the value list entry corresponding to the minimum value of range Y and into the list of ranges contained in the value list entry corresponding to the maximum value of range Y (process block 711 in FIG. 10). If constant value range Y has a width of 1 (i.e. its minimum value is identical to its maximum value), range Y is only inserted once into the list of ranges contained in the value list entry corresponding to the minimum value of range Y.

Because of the order in which ranges in the range list are processed in one embodiment, each constant value range X that is compared to constant value range Y will have a width that is less than or equal to that of range Y. A comparison of range X to range Y is only performed, when the minimum and/or the maximum value of range X is contained in the range Y. Only three possibilities are possible as follows: Range X partially overlaps range Y; Range X is nested inside range Y; and, Range X duplicates range Y. Given the relative widths of range X and range Y, it is not possible for range Y to be nested inside range X.

In the following discussion it is assumed that constant value range X originated from a term M and constant value range Y originated from a term N, according to one embodiment. It is also assumed that range X originated from a term in rule A and range Y originated from a term in rule B, according to one embodiment. The notation PartialOverlap [ABmin, ABmax] [Dimension] will be used to refer to the bit in the PartialOverlap[ABmin, ABmax] bit vector corresponding to the current classification dimension.

In the following discussion, tests are performed to identify situations of partial overlapping, nested overlapping, cyclic nested overlapping, and duplicate terms and rules. For each situation, the complete set of tests, and the necessary outcome of each test for the situation to exist is described. It will be evident in the discussion below that many of the tests and outcomes are common across multiple situations. In a preferred embodiment, the tests to detect the various situations are tightly integrated together to eliminate common tests in order to improve efficiency. The following discussion sacrifices efficiency for clarity of exposition. The preferred embodiment with merged tests is shown in FIGS. 15 to 20.

Figure 15:
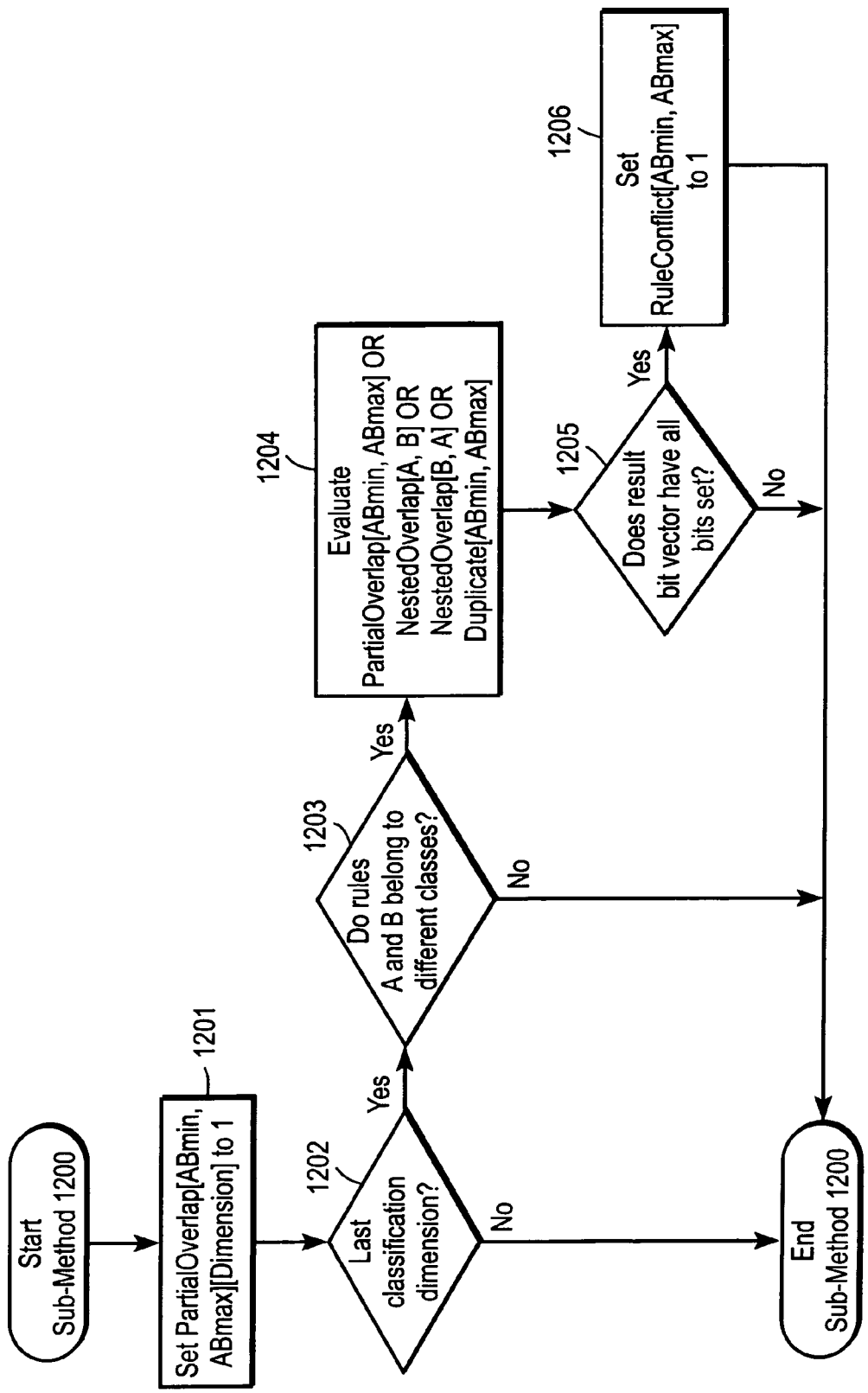
FIG. 15 is a flow diagram illustrating a method for evaluating partially overlapping ranges according to one embodiment.

FIG. 15 is a flow diagram illustrating a method for evaluating partially overlapping ranges according to one embodiment. If range X partially overlaps range Y process block 1107), the PartialOverlap[ABmin, ABmax][Dimension] bit is set to 1 (process block 1201 in FIG. 15). Setting the bit indicates that, for this particular dimension only, rule A partially overlaps rule B.

If range X partially overlaps range Y (process block 1107), and if the last classification dimension is being processed (process block 1202), and if the rules from which range X and range Y originated belong to different classes (process block 1203), the following expression is evaluated (process block 1204). In order to evaluate the expression, the bit vectors from the various array entries are bit-wise ORed together.

PartialOverlap[ABmin, ABmax] OR
Nestedoverlap[A, B] OR
Nestedoverlap[B, A] OR
Duplicate[ABmin, ABmax]

If the resulting bit vector has all of the bits set to 1 (process block 1205), rule A partially overlaps rule B. Because rules A and B belong to different classes, it is possible for a packet to classify to two classes simultaneously. This is an unacceptable rule conflict. The RuleConflict[ABmin, ABmax] array entry is set to 1 (process block 1206).

Figure 16:
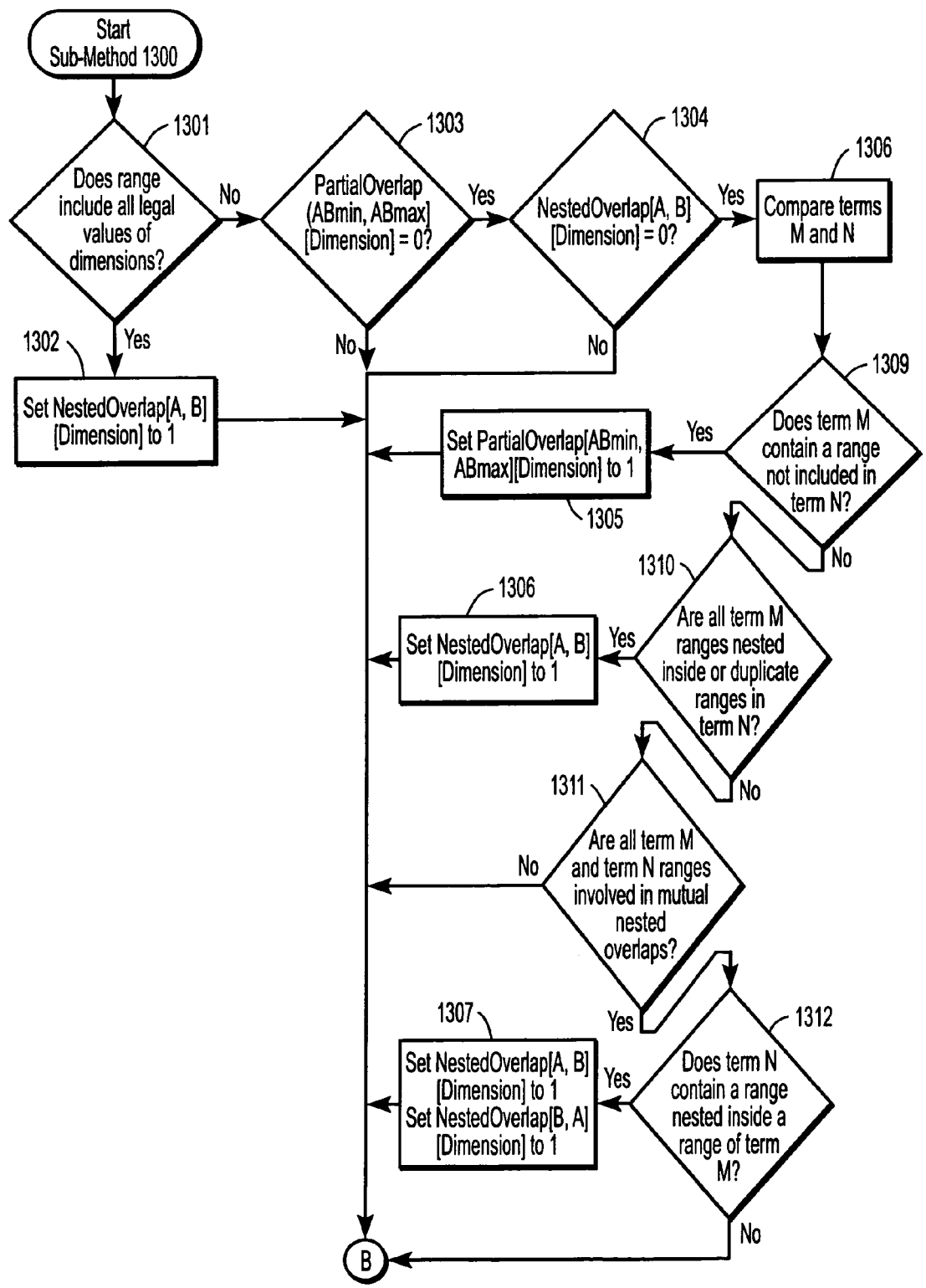
FIG. 16 is a flow diagram partially illustrating a method for evaluating nested ranges according to one embodiment.

FIG. 16 is a flow diagram partially illustrating a method for evaluating nested ranges according to one embodiment. If range X is nested inside range Y (process block 1108), and if range Y includes all legal values of the current classification dimension (process block 1301 in FIG. 16), the NestedOverlap[A, B] [Dimension] bit is set to 1 (process block 1302). Setting the bit indicates that, for this particular dimension only, rule A is nested inside rule B.

If range X is nested inside range Y (process block 1108), and if range Y does not include all legal values of the current classification dimension (process block 1301), and if PartialOverlap[ABmin, ABmax] [Dimension] is not set to 1 (process block 1303), and if NestedOverlap[A, B] [Dimension] is not set to 1 (process block 1304), terms M and N are compared (process block 1308). If term M contains a constant value range that is not included in term N (process block 1309), term M partially overlaps term N. The PartialOverlap[ABmin, ABmax] [Dimension] bit is set to 1 (process block 1305). Setting the bit indicates that, for this particular dimension only, rule A partially overlaps rule B.

If range X is nested inside range Y (process block 1108), and if range Y does not include all legal values of the current classification dimension (process block 1301), and if PartialOverlap[ABmin, ABmax] [Dimension] is not set to 1 (process block 1303), and if NestedOverlap[A, B] [Dimension] is not set to 1 (process block 1304), terms M and N are compared (process block 1308). If term M only contains constant value ranges that are either nested inside constant value ranges of term N or duplicate constant value ranges of term N (process block 1310), term M is nested inside term N. The NestedOverlap[A, B][Dimension] bit is set to 1 (process block 1306). Setting the bit indicates that, for this particular dimension only, rule A is nested inside rule B.

If range X is nested inside range Y (process block 1108), and if range Y does not include all legal values of the current classification dimension (process block 1301), and if PartialOverlap[ABmin, ABmax][Dimension] is not set to 1 (process block 1303), and if NestedOverlap[A, B][Dimension] is not set to 1 (process block 1304), terms M and N are compared (process block 1308). If term M only contains constant value ranges that are either nested inside constant value ranges of term N or encapsulate constant value ranges of term N (process block 1311), and if term N only contains constant value ranges that are either nested inside constant value ranges of term M or encapsulate constant value ranges of term M (process block 1311), and if at least one constant value range of term N is nested inside a constant value range of term M (process block 1312), term M is involved in a cyclic nested overlap with term N. The NestedOverlap[A, B] [Dimension] and NestedOverlap[B, A] [Dimension] bits are set to 1 (process block 1307). Setting these bits indicates that, for this particular dimension only, rule A is involved in a cyclic nested overlap with rule B.

Figure 17:
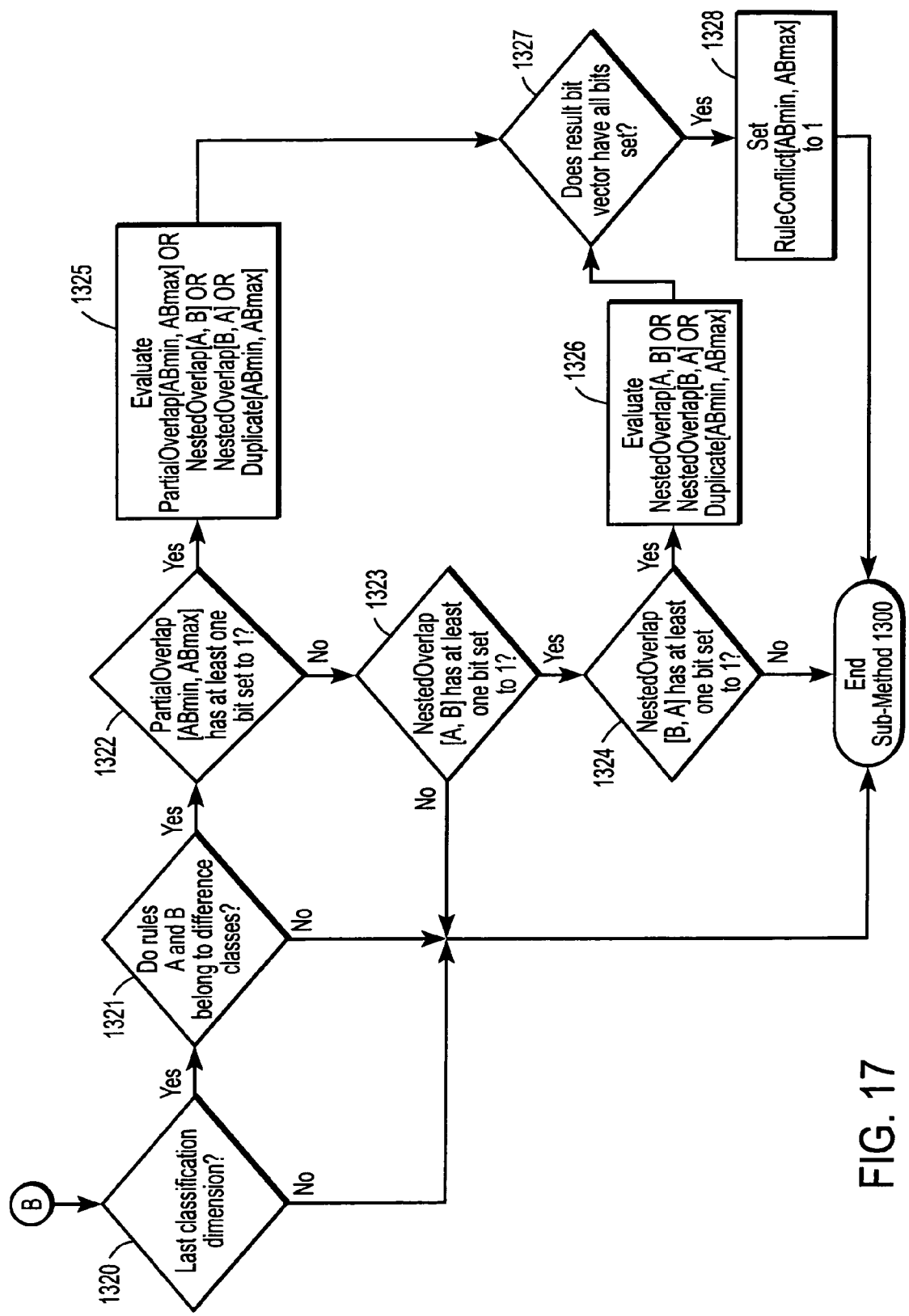
FIG. 17 is a flow diagram partially illustrating a method for evaluating nested ranges according to one embodiment.

FIG. 17 is a flow diagram partially illustrating a method for evaluating nested ranges according to one embodiment. If range X is nested inside range Y (process block 1108), and if the last classification dimension is being processed (process block 1320 in FIG. 17), and if the rules from which range X and range Y originated belong to different classes (process block 1321), and if PartialOverlap[ABmin, ABmax] has at least one bit set to 1 (process block 1322), the following expression is evaluated (process block 1325). In order to evaluate the expression, the bit vectors from the various array entries are bit-wise ORed together.

PartialOverlap[ABmin, ABmax] OR Nestedoverlap[A, B] OR
NestedOverlap[B, A] OR Duplicate [ABmin, ABmax]

If the resulting bit vector has all of the bits set to 1 (process block 1327), rule A partially overlaps rule B. Because rules A and B belong to different classes, it is possible for a packet to classify to two classes simultaneously. This is an unacceptable rule conflict. The RuleConflict[ABmin, ABmax] array entry is set to 1 (process block 1328).

If range X is nested inside range Y (process block 1108), and if the last classification dimension is being processed (process block 1320), and if the rules from which range X and range Y originated belong to different classes (process block 1321), and if PartialOverlap[ABmin, ABmax] has no bits set to 1 process block 1322), and if NestedOverlap[A, B] has at least one bit set to 1 (process block 1323), and if NestedOverlap[B, A] has at least one bit set to 1 (process block 1324), the following expression is evaluated (process block 1326). In order to evaluate the expression, the bit vectors from the various array entries are bit-wise ORed together.

NestedOverlap[A, B] OR NestedOverlap[B, A] OR Duplicate[ABmin, ABmax]

If the resulting bit vector has all of the bits set to 1 (process block 1327), rule A is involved in a cyclic nested overlap with rule B. Because rules A and B belong to different classes, it is possible for a packet to classify to two classes simultaneously. This is an unacceptable rule conflict. The RuleConflict[ABmin, ABmax] array entry is set to 1 (process block 1328).

Figure 18:
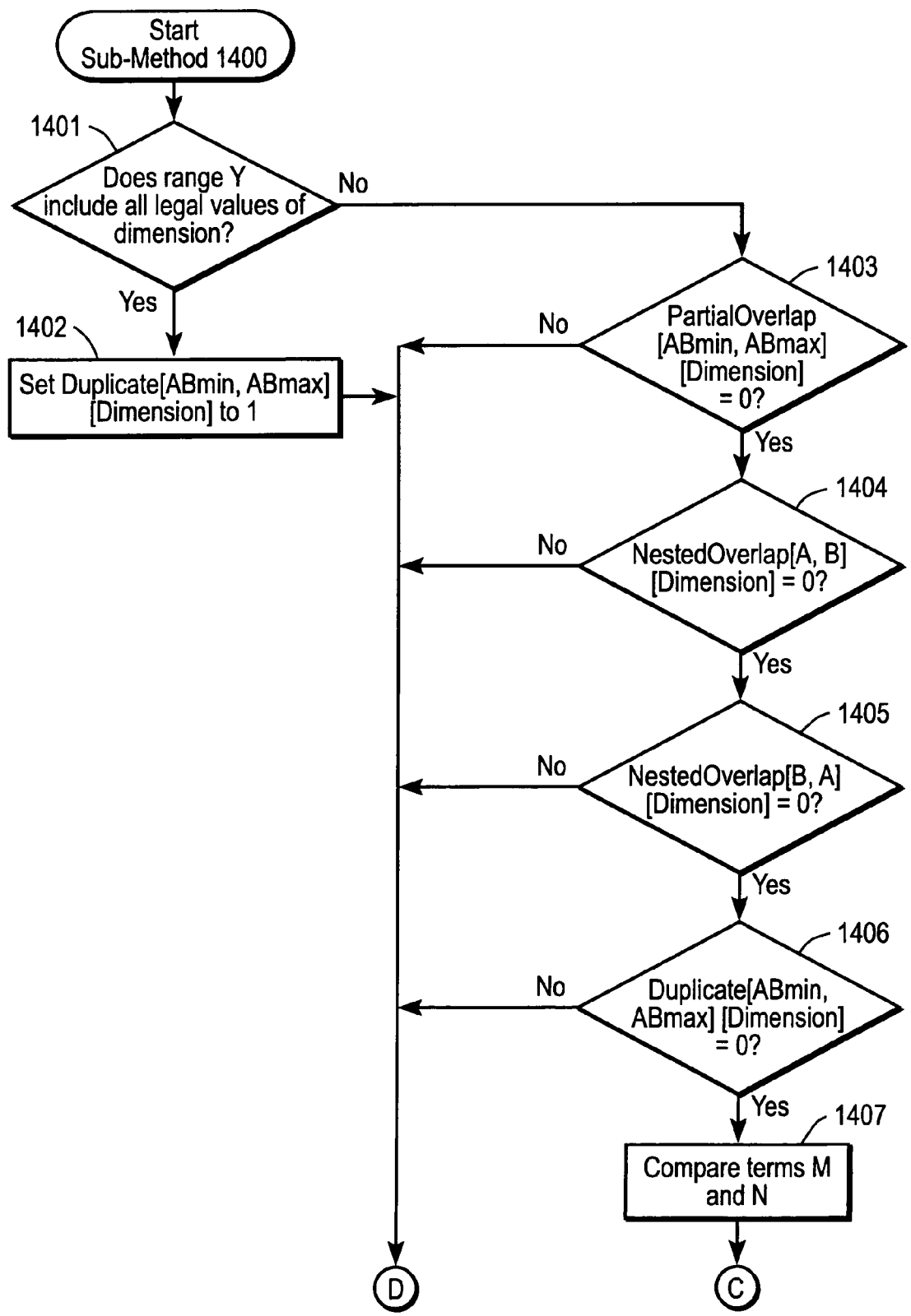
FIG. 18 is a flow diagram partially illustrating a method for evaluating duplicate ranges according to one embodiment.

FIG. 18 is a flow diagram partially illustrating a method for evaluating duplicate ranges according to one embodiment. If range X duplicates range Y (process block 1109), and if range Y includes all legal values of the current classification dimension (process block 1401 in FIG. 18), the Duplicate[ABmin, ABmax] [Dimension] bit is set to 1 process block 1402). Setting the bit indicates that, for this particular dimension only, rule A duplicates rule B.

Figure 19:
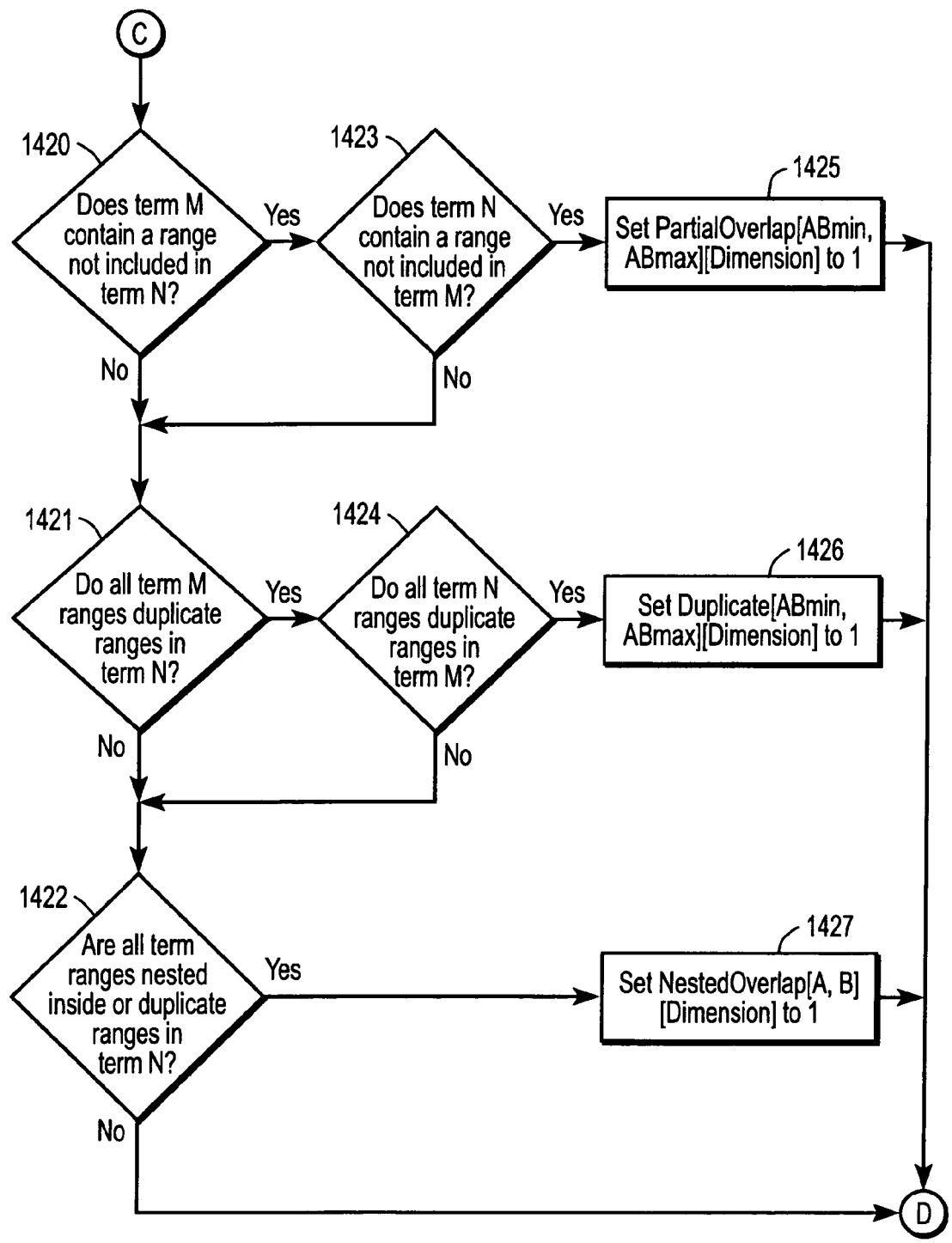
FIG. 19 is a flow diagram partially illustrating a method for evaluating duplicate ranges according to one embodiment.

FIG. 19 is a flow diagram partially illustrating a method for evaluating duplicate ranges according to one embodiment. If range X duplicates range Y process block 1109), and if range Y does not include all legal values of the current classification dimension (process block 1401), and if PartialOverlap[ABmin, ABmax] [Dimension] is not set to 1 (process block 1403), and if NestedOverlap[A, B][Dimension] is not set to 1 (process block 1404), and if NestedOverlap[B, A] [Dimension] is not set to 1 (process block 1405), and if Duplicate[ABmin, ABmax] [Dimension] is not set to 1 (process block 1406), terms M and N are compared (process block 1407). If term M contains a constant value range that is not included in term N (process block 1420 in FIG. 19), and if term N contains a constant value range that is not included in term M (process block 1423), term M partially overlaps term N. The PartialOverlap[ABmin, ABmax] [Dimension] bit is set to 1 (process block 1425). Setting the bit indicates that, for this particular dimension only, rule A partially overlaps rule B.

If range X duplicates range Y (process block 1109), and if range Y does not include all legal values of the current classification dimension (process block 1401), and if PartialOverlap[ABmin, ABmax] [Dimension] is not set to 1 (process block 1403), and if NestedOverlap[A, B] [Dimension] is not set to 1 (process block 1404), and if NestedOverlap[B, A] [Dimension] is not set to 1 (process block 1405), and if Duplicate[ABmin, ABmax] [Dimension] is not set to 1 (process block 1406), terms M and N are compared (process block 1407). If term M only contains constant value ranges that are duplicates of constant value ranges in term N (process block 1421), and if term N only contains constant value ranges that are duplicates of constant value ranges in term M (process block 1424), term M duplicates term N. The Duplicate[ABmin, ABmax] [Dimension] bit is set to 1 (process block 1426). Setting the bit indicates that, for this particular dimension only, rule A duplicates rule B.

If range X duplicates range Y (process block 1109), and if range Y does not include all legal values of the current classification dimension (process block 1401), and if PartialOverlap[ABmin, ABmax] [Dimension] is not set to 1 (process block 1403), and if NestedOverlap[A, B][Dimension] is not set to 1 (process block 1404), and if NestedOverlap[B, A] [Dimension] is not set to 1 (process block 1405), and if Duplicate[ABmin, ABmax] [Dimension] is not set to 1 process block 1406), terms M and N are compared (process block 1407). If term M only contains constant value ranges that are either nested inside constant value ranges of term N or duplicate constant value ranges of term N (process block 1422), term M is nested inside term N. The NestedOverlap[A, B] [Dimension] bit is set to 1 (process block 1427). Setting the bit indicates that, for this particular dimension only, rule A is nested inside rule B.

Figure 20:
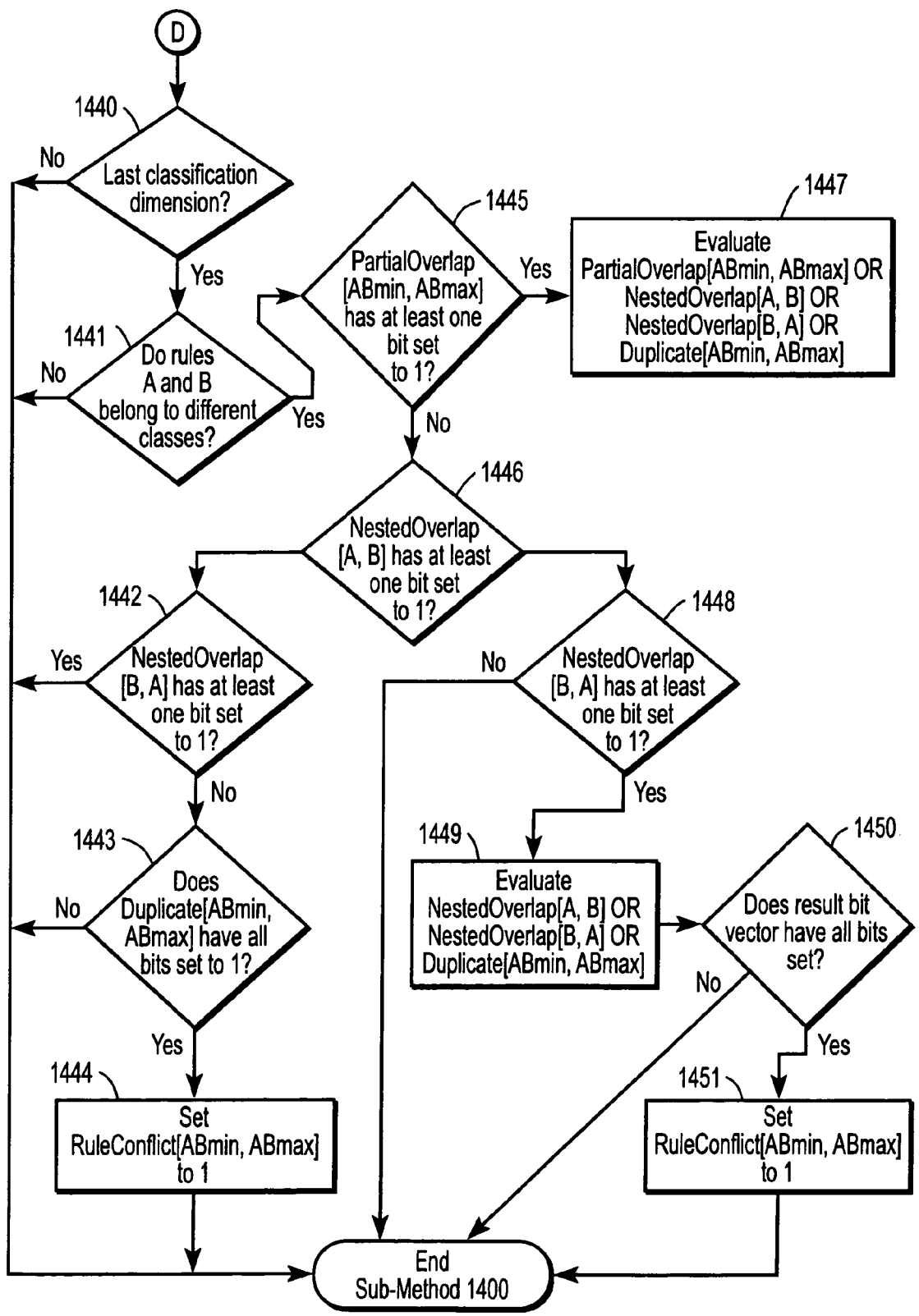
FIG. 20 is a flow diagram partially illustrating a method for evaluating duplicate ranges according to one embodiment.

FIG. 20 is a flow diagram partially illustrating a method for evaluating duplicate ranges according to one embodiment. If range X duplicates range Y (process block 1109), and if the last classification dimension is being processed (process block 1440 in FIG. 20), and if the rules from which range X and range Y originated belong to different classes (process block 1441), and if PartialOverlap[ABmin, ABmax] has at least one bit set to 1 (process block 1445), the following expression is evaluated (process block 1447). In order to evaluate the expression, the bit vectors from the various array entries are bit-wise ORed together.

PartialOverlap[ABmin, ABmax] OR NestedOverlap[A, B] OR

NestedOverlap[B, A] OR Duplicate[ABmin, ABmax]

If the resulting bit vector has all of the bits set to 1 (process block 1450), rule A partially overlaps rule B. Because rules A and B belong to different classes, it is possible for a packet to classify to two classes simultaneously. This is an unacceptable rule conflict. The RuleConflict[ABmin, ABmax] array entry is set to 1 (process block 1451).

If range X duplicates range Y (process block 1109), and if the last classification dimension is being processed (process block 1440), and if the rules from which range X and range Y originated belong to different classes (process block 1441), and if PartialOverlap[ABmin, ABmax] has no bits set to 1 (process block 1445), and if NestedOverlap[A, B] has at least one bit set to 1 (process block 1446), and if NestedOverlap[B, A] has at least one bit set to 1 (process block 1448), the following expression is evaluated (process block 1449). In order to evaluate the expression, the bit vectors from the various array entries are bit-wise ORed together.

NestedOverlap[A, B] OR NestedOverlap[B, A] OR Duplicate[ABmin, ABmax]

If the resulting bit vector has all of the bits set to 1 (process block 1450), rule A is involved in a cyclic nested overlap with rule B. Because rules A and B belong to different classes, it is possible for a packet to classify to two classes simultaneously. This is an unacceptable rule conflict. The RuleConflict[ABmin, ABmax] array entry is set to 1 (process block 1451).

If range X duplicates range Y (process block 1109), and if the last classification dimension is being processed (process block 1440), and if the rules from which range X and range Y originated belong to different classes (process block 1441), and if PartialOverlap[ABmin, ABmax] has no bits set to 1 (process block 1445), and if NestedOverlap[A, B] has no bits set to 1 (process block 1446), and if NestedOverlap [B, A] has no bits set to 1 (process block 1442), and if Duplicate[ABmin, ABmax] has all bits set to 1 (process block 1443), rule A duplicates rule B. Because rules A and B belong to different classes, it is possible for a packet to classify to two classes simultaneously. This is an unacceptable rule conflict. The RuleConflict[ABmin, ABmax] array entry is set to 1 (process block 1444).

In many places in the above tests, there is a process block where two terms M and N are compared to determine the nature of the overlaps that exist between the two terms. An easy way to perform this test is to create a separate set of flag bits for both terms M and N. The flag bits could have the following semantics:

this term contains a range that partially overlaps a range in the other term this term contains a range that is nested inside a range in the other term this term contains a range that encapsulates (reverse nesting) a range in the other term this term contains a range that duplicates a range in the other term.

Comparison could proceed by iterating through each range of term M. Each range in term M would be compared with all the ranges in term N. An appropriate one of the above flag bits for term N would be set for any overlaps found. A similar iteration through the ranges of term N and comparison with the ranges of term M would be used to set the flag bits of term N. The flag bits could then be used to make any final conclusion about the nature of the overlap between terms M and N in order to set an entry in the PartialOverlap, NestedOverlap, or Duplicate arrays.

Once the remainder of policy verification method 799 (sub-method 1000, process block 703, process block 705, process block 710, sub-method 1100, and process block 711) has been performed iteratively for each supported classification dimension (process blocks 702, 704, and 706), the final result of policy verification can be determined.

If, in one embodiment, the RuleConflict array has any bits set to 1 (process block 707 in FIG. 10), unacceptable rule conflicts exist in the set of policies being verified, so policy verification is considered to have failed (process block 709). Otherwise, if no bits are set to 1, policy verification has passed (process block 708).

In one embodiment, the specific bits that are set in the RuleConflict array can be used to identify the rules that conflict. The PartialOverlap, NestedOverlap, and Duplicate arrays can be used to provide details about the nature of the rule conflict to a user.

As will be apparent to those skilled in the art in the light of the foregoing disclosure, many alterations and modifications are possible in the practice of one embodiment without departing from the spirit or scope thereof. For example, the three arrays PartialOverlap, NestedOverlap, and Duplicate could in an alternative embodiment be replaced by a single Overlap array. Each entry in the Overlap array would be a vector, but instead of being a bit vector, it would be a vector of enumerated values. The legal enumerated values could be:

No Overlap
Partial Overlap
A Nested In B
B Nested In A
A and B Cyclically Nested
A Duplicates B Each enumerated value in the Overlap array could be, in one embodiment, represented in as little as 3 bits (depending on the memory efficiency of the programming language used) whereas the three arrays PartialOverlap, NestedOverlap, and Duplicate require a corresponding 4 bits. Using a single array with enumerated values would reduce the storage requirements and some of the tests in the product verification method would be simpler. On the other hand, other tests could be more complicated and it might no longer be possible to take advantage of the very efficient bit-wise ORing of bit vectors to determine whether two rules overlap across all dimensions. Using bit vectors may require less processing time whereas using enumerations may require less memory.

As mentioned previously, opinions may differ on what types of overlap are considered to be an error. One embodiment allows for considerable variation in the rules defining what constitutes an error. It is only necessary to remove or add the appropriate tests for the detection of the desired partial overlap, nested overlap, cyclic overlap, and duplicate situations.

Preferred embodiments may include logic hardware configured to perform a method of the invention or a computer system programmed to execute a method of the invention. The invention may also be provided in the form of a program product. The program product may comprise any medium which carries a set of computer-readable signals corresponding to instructions which, when run on a computer, cause the computer to execute a method of the invention. The program product may be distributed in any of a wide variety of forms. The program product may comprise, for example, physical media such as floppy diskettes, CD ROMs, DVDs, hard disk drives, flash RAM or the like or transmission-type media such as digital or analog communication links.

As will be apparent to those skilled in the art in the light of the foregoing disclosure, many alterations and modifications are possible in the practice of this invention without departing from the spirit or scope.

What is claimed is:

1. A computer implemented method for verifying service policies of routing network traffic in a network element, the method comprising:
receiving a number of classes of network traffic, each class having a number of classification rules;
outputting a result indicating a first class of the number of classes conflicts with a second class of the number of classes upon determining that at least one of classification rules of the first class overlaps with one of the classification rules of the second class, wherein the outputting of the result indicating the first class conflicts with the second class upon determining that the at least one of the classification rules of the first class is nested overlapped with one of the classification rules of the second class;
in response to the result, modifying at least a portion of the classification rules of the first and second classes to reduce the conflicts between the first and second classes; and
routing network traffic associated with the first and second classes according to the modified classification rules of the first and second classes.

2. The method of claim 1, wherein the outputting of the result indicating the first class conflicts with the second class upon determining that the at least one of the classification rules of the first class duplicates one of the classification rules of the second class.

3. The method of claim 1, wherein the outputting of the result indicating the first class conflicts with the second class upon determining that the at least one of the classification rules of the first class partially overlaps with one of the classification rules of the second class.

4. A computer implemented method for verifying service policies of routing network traffic in a network element, the method comprising:
receiving a number of classes of network traffic, each class having a number of classification rules;
outputting a result indicating a first class of the number of classes conflicts with a second class of the number of classes upon determining that at least one of classification rules of the first class overlaps with one of the classification rules of the second class, wherein the outputting of the result indicating the first class conflicts with the second class upon determining that the at least one of the classification rules of the first class is cyclic nested overlapped with one of the classification rules of the second class;
in response to the result, modifying at least a portion of the classification rules of the first and second classes to reduce the conflicts between the first and second classes; and
routine network traffic associated with the first and second classes according to the modified classification rules of the first and second classes.

5. A computer implemented method for verifying service policies of routing network traffic in a network element, the method comprising:
receiving a number of classes of network traffic, each class having a number of classification rules;
outputting a result indicating a first class of the number of classes conflicts with a second class of the number of classes upon determining that at least one of classification rules of the first class overlaps with one of the classification rules of the second class, wherein the number of classification rules of each class include a number of dimensions, each dimension including a number of rule terms, wherein the method comprises merging the number of rule terms for each dimension;

in response to the result, modifying at least a portion of the classification rules of the first and second classes to reduce the conflicts between the first and second classes; and routing network traffic associated with the first and second classes according to the modified classification rules of the first and second classes.

6. The method of claim 5, wherein the merging of the number of rule terms for each dimension comprises merging adjacent, overlapping and duplicate ranges of the number of rule terms for each dimension.

7. A computer implemented method for verifying service policies of routing network traffic in a network element, the method comprising:

receiving a number of classes of network traffic, each class having a number of classification rules;

outputting a result indicating whether a first class of the number of classes conflicts with a second class of the number of classes based on whether the classification rules of the first class overlap with the classification rules of the second class, wherein the number of classification rules of each class include a number of dimensions, each dimension including a number of rule terms, wherein the method comprises merging the number of rule terms for each dimension;

in response to the result, modifying at least a portion of the classification rules of the first and second classes to reduce the conflicts between the first and second classes; and routing network traffic associated with the first and second classes according to the modified classification rules of the first and second classes.

8. The method of claim 7, wherein the merging of the number of rule terms for each dimension comprises merging adjacent, overlapping and duplicate ranges of the number of rule terms for each dimension and wherein outputting the result indicating whether the first class conflicts with the second class is based on whether the number of rule terms for each dimension of the classification rules of the first class overlap with the number of rule terms for each dimension of the classification rules of the second class.

9. The method of claim 7, wherein the outputting of the result indicating whether the first class conflicts with the second class is based on whether the classification rules of the first class are duplicates of the classification rules of the second class.

10. The method of claim 7, wherein the outputting the result indicating whether the first class conflicts with the second class is based on whether the classification rules of the first class partially overlap with the classification rules of the second class.

11. A computer implemented method for verifying service policies of routing network traffic in a network element, the method comprising:

receiving a number of classes of network traffic, each class having a number of classification rules;

outputting a result indicating whether a first class of the number of classes conflicts with a second class of the number of classes based on whether the classification rules of the first class overlap with the classification rules of the second class, wherein the outputting the result indicating whether the first class conflicts with the second class is based on whether the classification rules of the first class nested overlap with the classification rules of the second class;

in response to the result, modifying at least a portion of the classification rules of the first and second classes to reduce the conflicts between the first and second classes; and routing network traffic associated with the first and second classes according to the modified classification rules of the first and second classes.

12. A computer implemented method for verifying service policies of routing network traffic in a network element, the method comprising:

receiving a number of classes of network traffic, each class having a number of classification rules;

outputting a result indicating whether a first class of the number of classes conflicts with a second class of the number of classes based on whether the classification rules of the first class overlap with the classification rules of the second class, wherein the outputting the result indicating whether the first class conflicts with the second class is based on whether the classification rules of the first class cyclic nested overlap with the classification rules of the second class;

in response to the result, modifying at least a portion of the classification rules of the first and second classes to reduce the conflicts between the first and second classes; and routing network traffic associated with the first and second classes according to the modified classification rules of the first and second classes.

13. A computer implemented method for verifying service policies of routing network traffic in a network element, the method comprising:

receiving a number of classes of network traffic, each class having a number of classification rules;

for each classification rule of a first class of the number of classes, performing the following:

determining whether a classification rule of the first class partially overlaps a classification rule of a second class of the number of classes;

determining whether a classification rule of the first class nested overlaps a classification rule of the second class;

determining whether a classification rule of the first class is a duplicate of a classification rule of the second class;

outputting a result indicating the first class conflicts with the second class upon determining that a classification rule of the first class partially overlaps, nested overlaps, or is a duplicate of a classification rule of the second class;

in response to the result, modifying at least a portion of the classification rules of the first and second classes to reduce the conflicts between the first and second classes; and routing network traffic associated with the first and second classes according to the modified classification rules of the first and second classes.

14. The method of claim 13, wherein the number of classification rules of each class include a number of dimensions, each dimension including a number of rule terms, wherein the method comprises merging the number of rule terms for each dimension.

15. The method of claim 14, wherein the merging of the number of rule terms for each dimension comprises merging adjacent, overlapping and duplicate ranges of the number of rule terms for each dimension.

16. The method of claim 15, wherein outputting the result indicating the first class conflicts with the second class comprises outputting the result indicating the first class conflicts with the second class upon determining that the number of rule terms for each dimension of the number of classification rules of the first class partially overlaps, nested overlaps, or is a duplicate of the number of rule terms for each dimension of the number of classification rules of the second class.

17. A machine-readable storage medium that provides instructions, which when executed by a machine, causes the machine to perform operations for verifying service policies of routing network traffic in a network element, the operations comprising:
  receiving a number of classes of network traffic, each class having a number of classification rules;
  outputting a result indicating a first class of the number of classes conflicts with a second class of the number of classes upon determining that at least one of classification rules of the first class overlaps with one of the classification rules of the second class, wherein the outputting of the result indicating the first class conflicts with the second class upon determining that the at least one of the classification rules of the first class is nested overlapped with one of the classification rules of the second class;
  in response to the result, modifying at least a portion of the classification rules of the first and second classes to reduce the conflicts between the first and second classes; and
  routing network traffic associated with the first and second classes according to the modified classification rules of the first and second classes.

18. The machine-readable medium of claim 17, wherein the outputting of the result indicating the first class conflicts with the second class upon determining that the at least one of the classification rules of the first class duplicates one of the classification rules of the second class.

19. The machine-readable medium of claim 17, wherein the outputting of the result indicating the first class conflicts with the second class upon determining that the at least one of the classification rules of the first class partially overlaps with one of the classification rules of the second class.

20. A machine-readable storage medium that provides instructions, which when executed by a machine, causes the machine to perform operations for verifying service policies of routing network traffic in a network element, the operations comprising:
  receiving a number of classes of network traffic, each class having a number of classification rules;
  outputting a result indicating a first class of the number of classes conflicts with a second class of the number of classes upon determining that at least one of classification rules of the first class overlaps with one of the classification rules of the second class, wherein the outputting of the result indicating the first class conflicts with the second class upon determining that the at least one of the classification rules of the first class is cyclic nested overlapped with one of the classification rules of the second class;
  in response to the result, modifying at least a portion of the classification rules of the first and second classes to reduce the conflicts between the first and second classes; and
  routing network traffic associated with the first and second classes according to the modified classification rules of the first and second classes.

21. A machine-readable storage medium that provides instructions, which when executed by a machine, causes the machine to perform operations for verifying service policies of routing network traffic in a network element, the operations comprising:
  receiving a number of classes of network traffic, each class having a number of classification rules;
  outputting a result indicating a first class of the number of classes conflicts with a second class of the number of classes upon determining that at least one of classification rules of the first class overlaps with one of the classification rules of the second class, wherein the number of classification rules of each class include a number of dimensions, each dimension including a number of rule terms, wherein the method comprises merging the number of rule terms for each dimension;
  in response to the result, modifying at least a portion of the classification rules of the first and second classes to reduce the conflicts between the first and second classes; and
  routing network traffic associated with the first and second classes according to the modified classification rules of the first and second classes.

22. The machine-readable medium of claim 21, wherein the merging of the number of rule terms for each dimension comprises merging adjacent, overlapping and duplicate ranges of the number of rule terms for each dimension.

23. A machine-readable storage medium that provides instructions, which when executed by a machine, causes the machine to perform operations for verifying service policies of routing network traffic in a network element the operations comprising:
  receiving a number of classes of network traffic, each class having a number of classification rules;
  outputting a result indicating whether a first class of the number of classes conflicts with a second class of the number of classes based on whether the classification rules of the first class overlap with the classification rules of the second class, wherein the number of classification rules of each class include a number of dimensions, each dimension including a number of rule terms, wherein the method comprises merging the number of rule terms for each dimension;
  in response to the result, modifying at least a portion of the classification rules of the first and second classes to reduce the conflicts between the first and second classes; and
  routing network traffic associated with the first and second classes according to the modified classification rules of the first and second classes.

24. A machine-readable storage medium that provides instructions, which when executed by a machine, causes the machine to perform operations for verifying service policies of routing network traffic in a network element, the operations comprising:
  receiving a number of classes of network traffic, each class having a number of classification rules;
  outputting a result indicating whether a first class of the number of classes conflicts with a second class of the number of classes based on whether the classification rules of the first class overlap with the classification rules of the second class, wherein the merging of the number of rule terms for each dimension comprises merging adjacent, overlapping and duplicate ranges of the number of rule terms for each dimension and wherein outputting the result indicating whether the first class conflicts with the second class is based on whether the number of rule terms for each dimension of the classification rules of the first class overlap with the number of rule terms for each dimension of the classification rules of the second class;

in response to the result, modifying at least a portion of the classification rules of the first and second classes to reduce the conflicts between the first and second classes; and routing network traffic associated with the first and second classes according to the modified classification rules of the first and second classes.

25. The machine-readable medium of claim 23, wherein the outputting of the result indicating whether the first class conflicts with the second class is based on whether the classification rules of the first class are duplicates of the classification rules of the second class.

26. The machine-readable medium of claim 23, wherein the outputting the result indicating whether the first class conflicts with the second class is based on whether the classification rules of the first class partially overlap with the classification rules of the second class.

27. A machine-readable storage medium that provides instructions, which when executed by a machine, causes the machine to perform operations for verifying service policies or routing network traffic in a network element, the operations comprising:

receiving a number of classes of network traffic, each class having a number of classification rules;

outputting a result indicating whether a first class of the number of classes conflicts with a second class of the number of classes based on whether the classification rules of the first class overlap with the classification rules of the second class, wherein the outputting the result indicating whether the first class conflicts with the second class is based on whether the classification rules of the first class nested overlap with the classification rules of the second class;

in response to the result, modifying at least a portion of the classification rules of the first and second classes to reduce the conflicts between the first and second; and routine network traffic associated with the first and second classes according to the modified classification rules of the first and second classes.

28. A machine-readable storage medium that provides instructions, which when executed by a machine, causes the machine to perform operations for verifying service policies of routing network traffic in a network element, the operations comprising:

receiving a number of classes of network traffic, each class having a number of classification rules;

outputting a result indicating whether a first class of the number of classes conflicts with a second class of the number of classes based on whether the classification rules of the first class overlap with the classification rules of the second class, wherein the outputting the result, indicating whether the first class conflicts with the second class is based on whether the classification rules of the first class cyclic nested overlap with the classification rules of the second class;

in response to the result, modifying at least a portion of the classification rules of the first and second classes to reduce the conflicts between the first and second classes; and routing network traffic associated with the first and second classes according to the modified classification rules of the first and second classes.

29. A machine-readable storage medium that provides instructions, which when executed by a machine, causes the machine to perform operations for verifying service policies of routing network traffic in a network element, the operations comprising:

receiving a number of classes of network traffic, each class having a number of classification rules;

for each classification rule of a first class of the number of classes, performing the following:

determining whether a classification rule of the first class partially overlaps a classification rule of a second class of the number of classes;

determining whether a classification rule of the first class nested overlaps a classification rule of the second class;

determining whether a classification rule of the first class is a duplicate of a classification rule of the second class;

outputting a result indicating the first class conflicts with the second class upon determining that a classification rule of the first class partially overlaps, nested overlaps, or is a duplicate of a classification rule of the second class;

in response to the result, modifying at least a portion of the classification rules of the first and second classes to reduce the conflicts between the first and second classes; and routing network traffic associated with the first and second classes according to the modified classification rules of the first and second classes.

30. The machine-readable medium of claim 29, wherein the number of classification rules of each class include a number of dimensions, each dimension including a number of rule terms, wherein the method comprises merging the number of rule terms for each dimension.

31. The machine-readable medium of claim 30, wherein the merging of the number of rule terms for each dimension comprises merging adjacent, overlapping and duplicate ranges of the number of rule terms for each dimension.

32. The machine-readable medium of claim 31, wherein outputting the result indicating the first class conflicts with the second class comprises outputting the result indicating the first class conflicts with the second class upon determining that the number of rule terms for each dimension of the number of classification rules of the first class partially overlaps, nested overlaps, or is a duplicate of the number of rule terms for each dimension of the number of classification rules of the second class.

* * * * *